United States Patent
Morishige et al.

(10) Patent No.: US 7,406,064 B2
(45) Date of Patent: Jul. 29, 2008

(54) COMMUNICATION SYSTEM, SERVER, ROUTER, AND MOBILE COMMUNICATIONS TERMINAL

(75) Inventors: Takehiro Morishige, Hachioji (JP); Go Ono, Kokubunji (JP); Kenichiro Tomizawa, Fujisawa (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 482 days.

(21) Appl. No.: 11/040,013

(22) Filed: Jan. 24, 2005

(65) Prior Publication Data

US 2006/0056369 A1    Mar. 16, 2006

(30) Foreign Application Priority Data

Sep. 10, 2004 (JP) ............................. 2004-263190

(51) Int. Cl.
*H04Q 7/28* (2006.01)
(52) U.S. Cl. ...................... 370/331; 370/328; 370/338; 455/439; 455/436
(58) Field of Classification Search ................ 370/331, 370/338, 328; 455/439, 436
See application file for complete search history.

(56) References Cited

U.S. PATENT DOCUMENTS

| 2004/0013099 A1* | 1/2004 | O'Neill | 370/338 |
| 2004/0179489 A1* | 9/2004 | Suzuki et al. | 370/328 |
| 2005/0237962 A1* | 10/2005 | Upp et al. | 370/313 |

OTHER PUBLICATIONS

D. Johnson et al., "Mobility Support in IPv6", Network Working Group, Standards Track, (Jun. 2004), pp. 1-130.
Rajeev Koodli, Editor, "Fast Handovers for Mobile IPv6 Draft-IETF-MIPSHOP-Fast-MIPv6-02.txt", Mipshop Working Group, Internet Draft (Jul. 19, 2004), pp. 1-48.

* cited by examiner

*Primary Examiner*—Danh C Le
(74) *Attorney, Agent, or Firm*—Reed Smith LLP; Stanley P. Fisher, Esq.; Juan Carlos A. Marquez, Esq.

(57) ABSTRACT

Mobile terminals have the problem of large packet loss during movement because the mobile terminal has no opportunity to detect movement and generate a new care-of address until a new router advertisement is received, and also cannot register the position in the home agent. The present invention is characterized in including a means to automatically collect network information on access router devices in the vicinity of a particular access router device, and a means to send information in the router advertisement including information on at least one or more adjacent access router devices. The mobile terminal selects an access router device to become the next movement destination, and the most essential characteristic is a means to register the position information beforehand in the home agent.

5 Claims, 20 Drawing Sheets

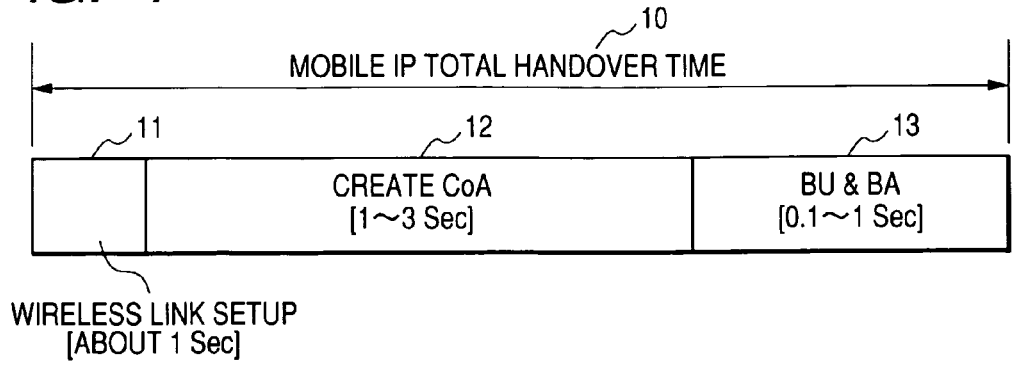
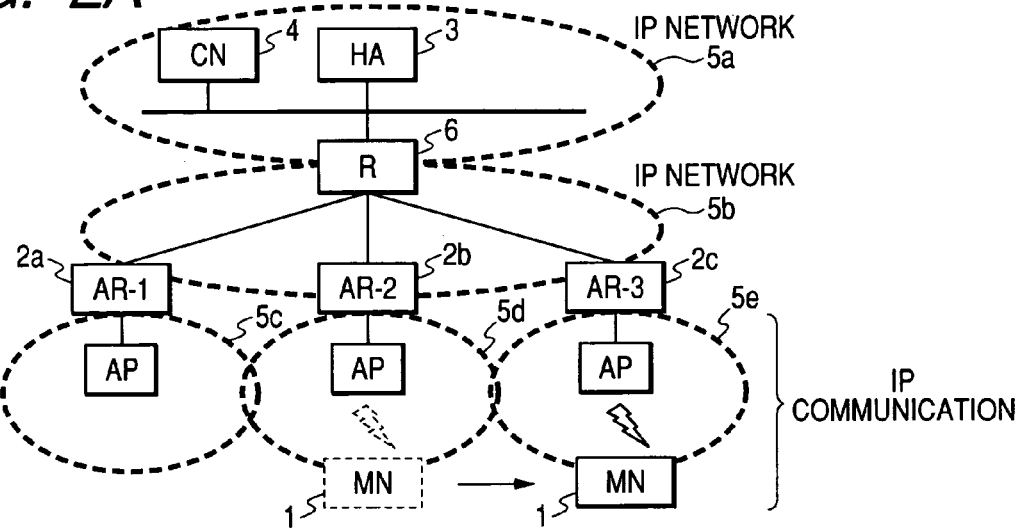
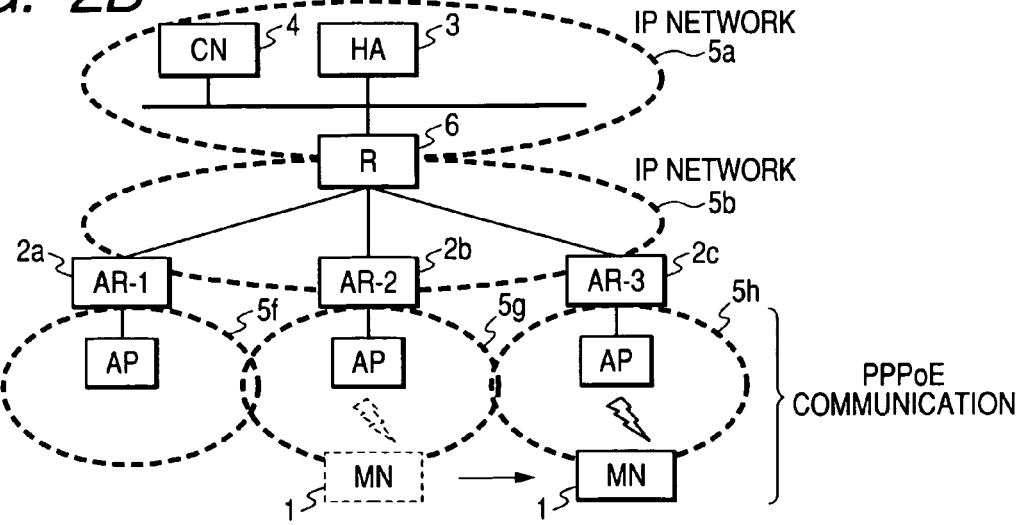

S31, S38 IPv6 ROUTER ADVERTISEMENT MESSAGE FORMAT

S32, S39, S44 MOBILE IPv6 BINDING UPDATE MESSAGE FORMAT

FIG. 10A

116, 215 ROUTER INFORMATION MANAGEMENT TABLE

| 801 NETWORK PREFIX | 802 PREFIX LENGTH | 803 GW ADDRESS | 804 PROXIMITY FLAG | 805 AR FLAG | 806 LONGITUDE | 807 LATITUDE | 808 ALTITUDE | 809 NO. OF HOPS | 810 REFERENCE FLAG |
|---|---|---|---|---|---|---|---|---|---|
|  |  |  |  |  |  |  |  |  |  | 800-1
|  |  |  |  |  |  |  |  |  |  | 800-2
|  |  |  |  |  |  |  |  |  |  | 800-n

FIG. 10B

115 TERMINAL INFORMATION MANAGEMENT TABLE

| 821 MN HOME ADDRESS | 822 CoA LIST (IN-USE) | 823 CONNECTED AR NETWORK PREFIX | 824 LONGITUDE | 825 LATITUDE | 826 ALTITUDE |
|---|---|---|---|---|---|
|  |  |  |  |  |  | 820-1
|  |  |  |  |  |  | 820-2
|  |  |  |  |  |  | 820-n

827a PRIORITY 1 CoA → 827b PRIORITY 2 CoA → 827c PRIORITY n CoA

FIG. 11A

117 BINDING UPDATE MANAGEMENT TABLE

| BU TRANSMIT DESTINATION ADDRESS (831) | MN HOME ADDRESS (832) | CURRENT MN CoA (833) | NEXT PERIOD MN CoA (834) | LIFETIME (835) | CONTROL FLAG (836) | SEQUENCE NO. (837) |
|---|---|---|---|---|---|---|
|  |  |  |  |  |  |  | ~ 830-1
|  |  |  |  |  |  |  | ~ 830-2
|  |  |  |  |  |  |  | ~ 830-n

FIG. 11B

313 BINDING CACHE MANAGEMENT TABLE

| MN HOME ADDRESS (841) | CURRENT MN CoA (842) | NEXT PERIOD MN CoA (843) | LIFETIME (844) | CONTROL FLAG (845) | SEQUENCE NO. (846) |
|---|---|---|---|---|---|
|  |  |  |  |  |  | ~ 840-1
|  |  |  |  |  |  | ~ 840-2
|  |  |  |  |  |  | ~ 840-n

F4 RIPng PROCESSING FLOW DURING RIPng TRANSMIT

F5 RIPng PROCESSING FLOW DURING RIPng RECEIVE

F6 RA TRANSMIT PROCESSING FLOW (AR)

F7 RA RECEIVE PROCESSING - RECEIVE THE RA (MN)

F7 RA RECEIVE PROCESSING - TRANSMIT THE BU (MN)

F8 BU RECEIVE PROCESSING (HA, CN)

F9 PACKET RELAY PROCESSING (HA)

F10 RECEIVE ENCAPSULATED PACKET - TRANSMIT BU (MN)

F11 LONGITUDE OPTIMIZATION PACKET TRANSFER PROCESS (CN)

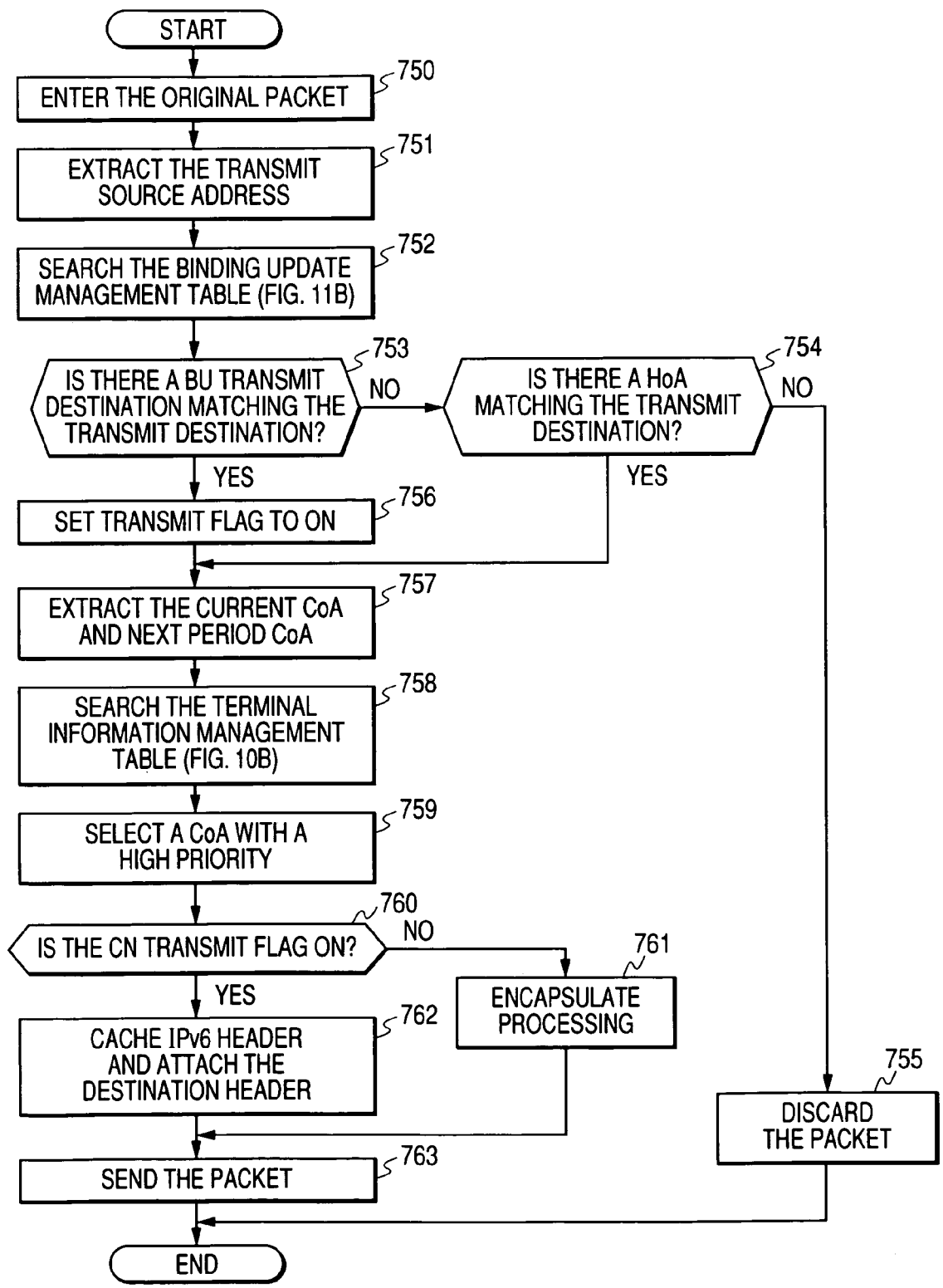

COMMUNICATION SYSTEM, SERVER, ROUTER, AND MOBILE COMMUNICATIONS TERMINAL

CLAIM OF PRIORITY

The present application claims priority from Japanese application JP 2004-263190 filed on Sep. 10, 2004, the content of which is hereby incorporated by reference into this application.

FIELD OF THE INVENTION

The present invention relates to a method for preventing packet loss that accompanies movement of the mobile terminal during mobile unit communications. The invention relates in particular to a mobile detection method for use when a mobile terminal is utilizing a Mobile IP protocol for mobile communications, and a router advertisement distribution method for access routers utilized to implement that mobile detection method.

BACKGROUND OF THE INVENTION

In recent years, many intensive studies have been made on IP (Internet Protocol) for mobile communication networks.

The IETF (Internet Engineering Task Force) is proceeding with efforts to standardize Mobile IPv6 specifications. The essential elements comprising a Mobile IPv6 network are a mobile node (hereafter expressed as MN), a home agent (hereafter expressed as HA), a correspondent node (hereafter expressed as CN), and an access router (hereafter expressed as AR).

The basic operation of Mobile IPv6 is described next. An IP address (home address, hereafter expressed as HoA) that does not change even if the MN has moved, is assigned to the MN1. Therefore, an application that starts up on the MN can continue running without stopping even if the MN is moving. A network possessing a network prefix identical to the HoA is called a home network. When the MN moves to a network (host network) other than the home network, it acquires an IP address that conforms to the communication protocol within that host network. This IP address is called the Care of Address (hereafter expressed as CoA).

The MN receives a router advertisement (RA) sent periodically from the AR located in the host network. If the network prefix detected at this time that is different from the HoA, then this signifies movement has been detected and a CoA is then generated. The MN that detected movement sends to the HA, a position registration message (Binding Update: BU) requesting the relay of a packet for an MN destination sent to the home network. The HA that received the binding update creates a binding cache to link the MN home address with the care of address (CoA). The HA afterwards sends a position registration reply message (Binding Ack: BA) to the MN, and broadcasts a packet acquisition message (Gratuitous Neighbor Advertisement: G-NA) as a proxy for receiving the packet addressed to the MN moving in the host network. The CN is the communication correspondent node (other communication party) for the MN. The CN sends a packet addressed to the HoA of the MN. The HA receives as a proxy, the HoA addressed packet for the MN. The HA searches the Binding Cache and acquires a CoA corresponding to the HoA for the MN. The HA attaches (encapsulates) an IP header for the CoA that matches the original received packet and sends that packet. The MN removes (decapsulates) the encapsulated header of the CoA. The CN can then receive the packet sent addressed to the HoA of the MN, which is the original packet.

However, in the technology of the related art the MN cannot identify movement of the mobile terminal until a router advertisement is received from the AR installed within the host network at the movement destination. The packet from the CN cannot be received during this time, because a new CoA cannot be generated and position registration messages (binding updates) cannot be exchanged due to failure to identify movement of the mobile terminal.

[Non-patent document 1] D. Johnson et. al. "Mobility Support in IPv6", IETF 2003, http://www.ietf.org/internet-drafts/draft-ietf-MobileIP-IPv6-24.txt

SUMMARY OF THE INVENTION

Problems that occur during handovers in the technology of the related art are described next. As shown in FIG. 1, the time 10 required for completing a handover in Mobile IPv6 is broadly grouped into a CoA generation time 12 for generating a CoA after receiving an RA with the wireless link setup 11; and a binding update time 13 up to completion of the binding update (position registration). Shortening this CoA generation time 12 and the binding update time 13 is an effective way to make the handover more efficient.

In the technology of the related art however, the access router advertisement sent by the access router in the host network only contains network information for the access router itself. The mobile terminal therefore has no opportunity to detect movement and generate a new CoA until the mobile terminal receives a new router advertisement from the movement destination. Also a binding update (position registration) of the home agent cannot be performed and shortening the handover time becomes difficult. The technology of the related art has the further problem of large packet loss accompanying movement of the mobile terminal. Resolving these problems requires that the mobile terminal be capable of acquiring network information about the next access router it will connect to after the switching from currently connected access router, and complete the binding update (position registration) before moving.

The present invention is characterized in including a means to automatically collect network information such as the network prefix for neighboring (or nearby) access routers near the access router device, and a means to send information in the router advertisement message including information on at least one or more adjacent access router devices. In the most essential characteristic of the present invention, the mobile terminal selects an access router device to become the next movement destination, and registers the position information (makes a binding update) beforehand in the home agent.

The mobile terminal of the present invention is capable of acquiring network information on the movement destination prior to movement. The invention therefore has the merit that packet loss after movement is prevented since the binding update (position registration) can be made beforehand. The invention has the further merit that management such as of settings that accompanies adding or removing access routers by the administrator can be simplified since the access router automatically collects information on nearby access routers.

BRIEF DESCRIPTION OF THE DRAWINGS

FIG. 1 is a drawing for showing details of the time required for implementing the IETF standard MobileIPv6 handover in the technology of the related art;

FIG. 2-A is a diagram showing the network structure for the present invention (first embodiment);

FIG. 2B is a diagram showing the network structure for the present invention (second embodiment);

FIG. 3-B is a drawing showing the structure of the software for the access router device;

FIG. 4-B is a block diagram showing the structure of the software of the mobile terminal;

FIG. 5-B is a block diagram showing the structure of the software of the home agent and the correspondent terminal (other party terminal);

FIG. 10-A is a drawing showing the structure of the router information management table;

FIG. 10-B is a drawing showing the structure of the terminal information management table;

FIG. 11-A is a drawing showing the structure of the Binding Update management table;

FIG. 11-B is a drawing showing the structure of the Binding Cache management table;

FIG. 21 is a flow chart showing the process flow for sending the packet by the mobile terminal.

DETAILED DESCRIPTION OF THE PREFERRED EMBODIMENTS

Figure 3A:
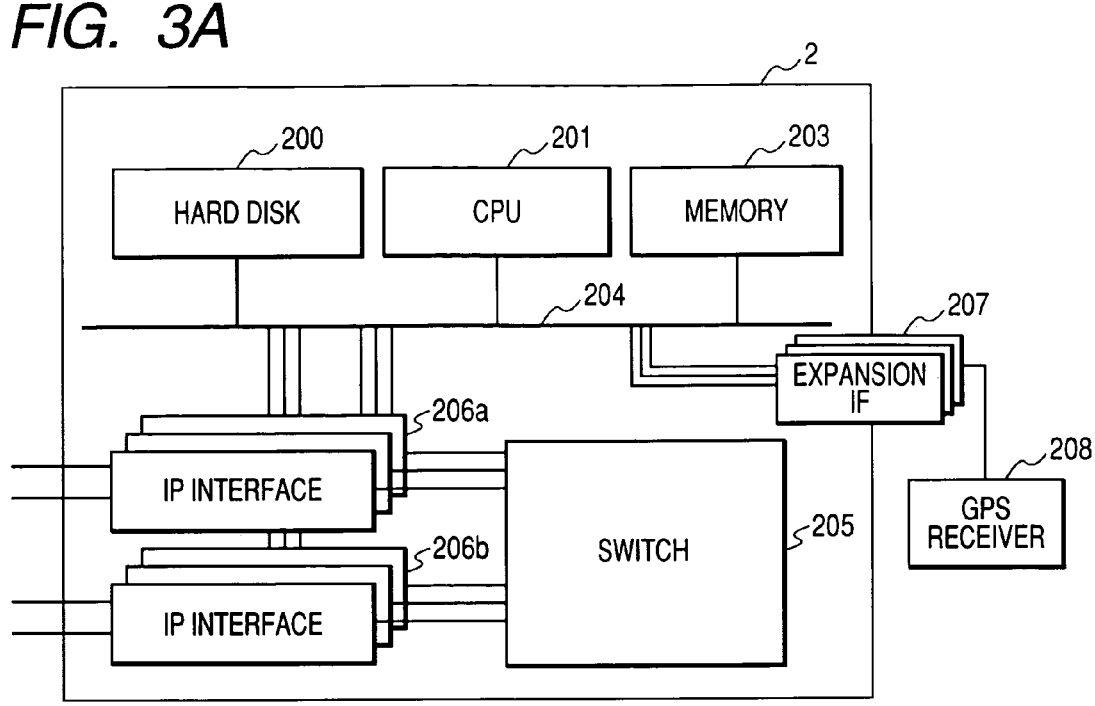
FIG. 3-A is a drawing showing the structure of the software for the access router device.

The embodiment of the present invention is described next while referring to the accompanying drawings. The present invention is represented by two embodiments. The difference in the embodiments lies in the network connection method used by the mobile terminal. These respective connection methods are shown in FIG. 2-A and FIG. 2B.

First Embodiment

Networks connecting to each device are all comprised of IP networks as shown in the network structure of the first embodiment in FIG. 2-A. An HA (home agent) 3 for relaying the packet addressed to MN1, and a CN4 as the correspondent node (other communication party) for MN1 are connected to the home network 5a of MN1. A packet relay network 5b is installed between the home network 5a and the wireless networks (host network 5c, 5d, 5e) connected to movement destination MN1. A router 6 is installed at the boundary of the home network 5a and the packet relay network 5b. The access routers (2-A, 2b, 2c) are installed at the boundary of the host networks (5c, 5d, 5e) connected to the movement destination MN1 and the packet relay network 5b. The MN1 is IP-connected to the host network via the access points (hereafter called AP) connected to the AR (2-a, 2b, 2c).

In FIG. 2-B showing the network structure of the second embodiment, the devices connected to each network are the same as in the first embodiment. In the second embodiment, the MN1 is connected by PPP (Point-to-Point Protocol) to the AR (2a, 2b, 2c) from the host networks (5f, 5g, 5h) connected to the movement destination, and the IP connection is then made.

Sections not relating to the embodiments of the present invention are described next.

Figure 3B:
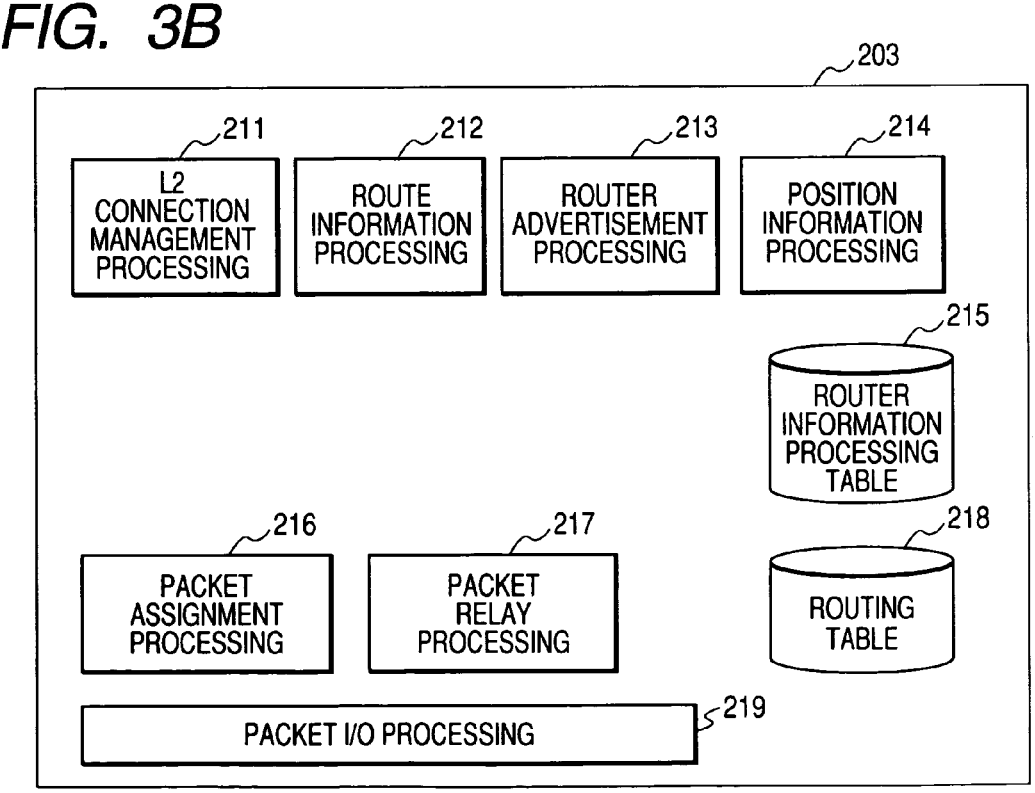

FIG. 3-A is a drawing showing the structure of the hardware for the AR2 in the present invention. The AR2 is made up of at least six hardware blocks. Each of these hardware blocks is described next.

At least two or more IP interfaces (206a, 206b) for sending and receiving the IP packets.
  A switch 205 for the IP interfaces
  A hard disk 200 for storing information such as file settings that determine the operation of devices and software of the present invention
  A memory 203 as a region temporarily utilized when executing the software of the present invention
  A CPU 201 for managing the control of this device
  An expansion interface 207 utilized when connecting the peripheral equipment to this device.

All the above hardware blocks are connected by the bus 204. A GPS receiver 208 is connected to the expansion interface 207 of the present invention for the purpose of collecting the physical position information of the AR2. This GPS receiver may be installed internally in the AR2. Also the physical position information may be collected by a means other than a GPS receiver.

FIG. 3-B is a drawing showing the software structure of the AR2 of the present invention. When an IP packet arrives at AR2, the packet I/O processing 219 extracts the received IP packet. The packet I/O processing 219 verifies the destination address of the IP packet and if addressed to itself (AR2), sorts the packet in the packet assignment processing 216. If not addressed to itself (the AR2), the packet is relayed by the packet relay processing 217. The packet assignment processing 216 verifies the data section of the IP packet, selects the next processing, and performs the appropriate processing. The packet relay processing 217 searches the routing table 218, determines the next destination to relay the IP packet to, and relays the IP packet via the packet I/O processing 219.

The L2 (layer 2) connection processing 211 is required in the second embodiment. The L2 connection processing 211 mainly controls the PPP termination processing and connection management. The route information processing 212 is used during replacement of route information utilized in the routing protocol typically shown for RIPng in the example in FIG. 7. The router advertisement processing 213 controls the distribution of the router advertisement message sent from the AR2 as shown in the example in FIG. 8. The position information processing 214 controls the collection and management of the physical position information made up of the AR2 longitude, latitude and altitude. The present invention is characterized by the route information processing 212 and router advertisement processing 213 and the position information management processing 215. The information acquired in each of the different processing is stored in the router information processing table 214 as shown in the example in FIG. 10-A. The AR2 establishes the contents of the processing for the AR2 to perform and operation with information stored in the IP packet by searching the router information management table 215.

Figure 4A:
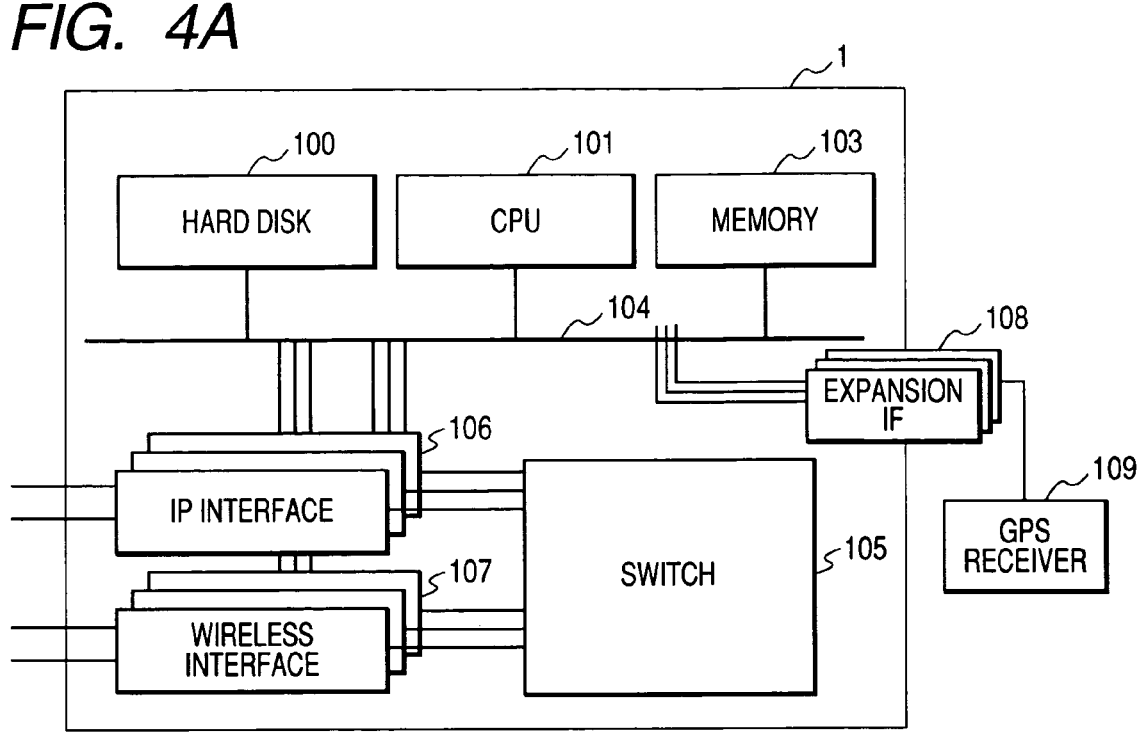
FIG. 4-A is a block diagram showing the structure of the hardware of the mobile terminal.
Figure 4B:
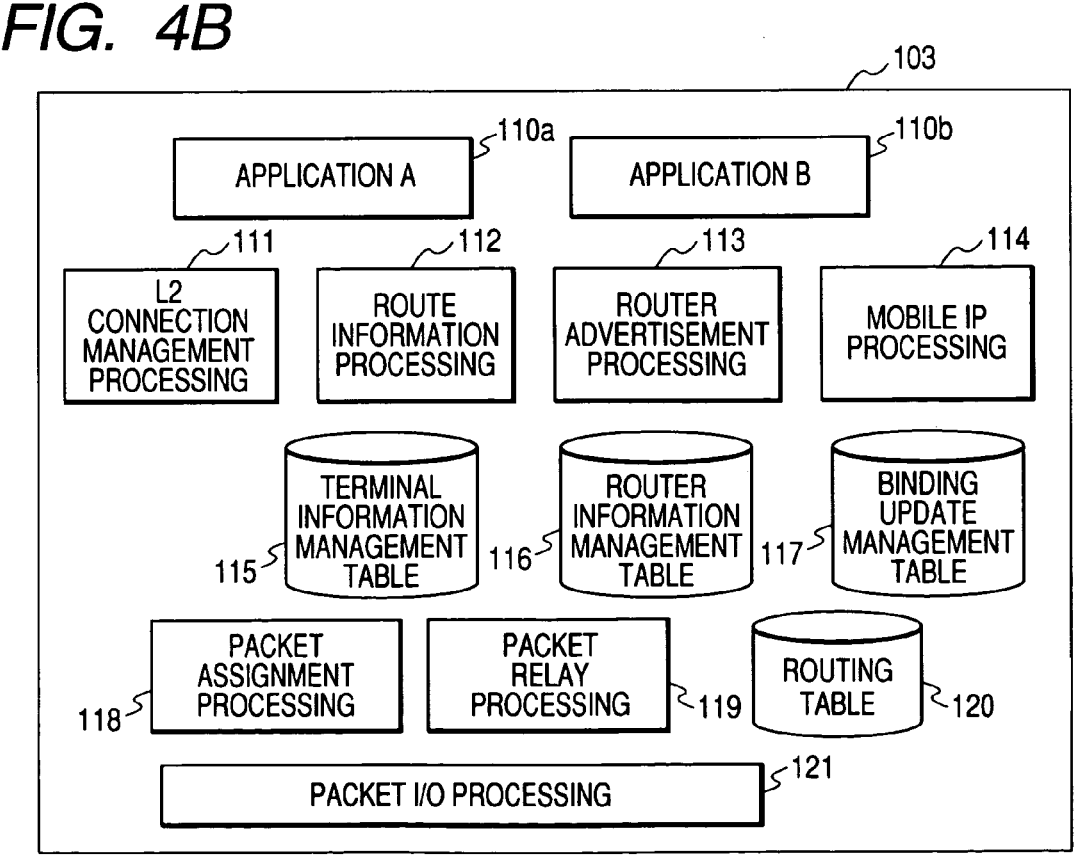

FIG. 4-A is a block diagram showing the hardware structure of the MN1 that is the mobile terminal of the present invention. Each of these hardware blocks is described next.

At least one or more IP interfaces 106 for sending and receiving the IP packets.
At least one or more wireless IP interfaces 107 for sending and receiving the IP packets.
A switch 205 for the IP interfaces
A hard disk 100 for storing information such as file settings that determine the operation of devices and software of the present invention
A memory 103 as a region temporarily utilized when executing the software of the present invention
A CPU 101 for managing the control of this device
An expansion interface 208 utilized when connecting the peripheral equipment to this device.

All the above hardware blocks are connected by the bus 104. A GPS receiver 109 is connected to the expansion interface 108 of the present invention for the purpose of collecting the physical position information of the MN1. This GPS receiver may be installed internally in the MN1. Also the physical position information may be collected by a means other than a GPS receiver. A structure not utilizing the hard disk 100 may be contrived by storing the information in the memory 103 instead of the hard disk 100.

FIG. 4-B is a block diagram showing the structure of the software of the MN-1 (mobile terminal) of the present invention. The Packet I/O processing 121 extracts IP packet received at the MN1. The packet I/O processing 121 verifies the destination address of the IP packet and if addressed to itself (MN1), sorts the packet in the packet assignment processing 118. If not addressed to itself (the MN1), the packet is relayed by the packet relay processing 119. The packet assignment processing 118 verifies the data section of the IP packet, selects the next processing, and performs the appropriate processing. The packet relay processing 119 searches the routing table 120, determines the next destination to relay the IP packet, and relays the IP packet via the packet I/O processing 121. The L2 (layer 2) connection management processing 111 is required in the second embodiment for making PPP connections to the AR2. The position information processing 112 controls the collection and management of the physical position information made up of the MN1 longitude, latitude and altitude. The acquired information is stored in the router information management table 116 shown in the example in FIG. 10-A and the terminal information management table 115 shown in the example in FIG. 10B. The router advertisement processing 113 controls the movement detection control of the MN1 and receiving the router advertisement message sent from AR2 and shown in the example in FIG. 8. The acquired information is stored in the router information management table 116 and the terminal information management table 115. The Mobile IP processing 114 controls the relay of the IP encapsulated packet and the position registration processing (binding update) using the Mobile IP binding update (request) message shown in the example in FIG. 9. The Mobile IP processing 114 also manages the information such as the CoA and HoA relating to the Mobile IP, in the binding update management table in the example shown in FIG. 11-A.

Figure 5A:
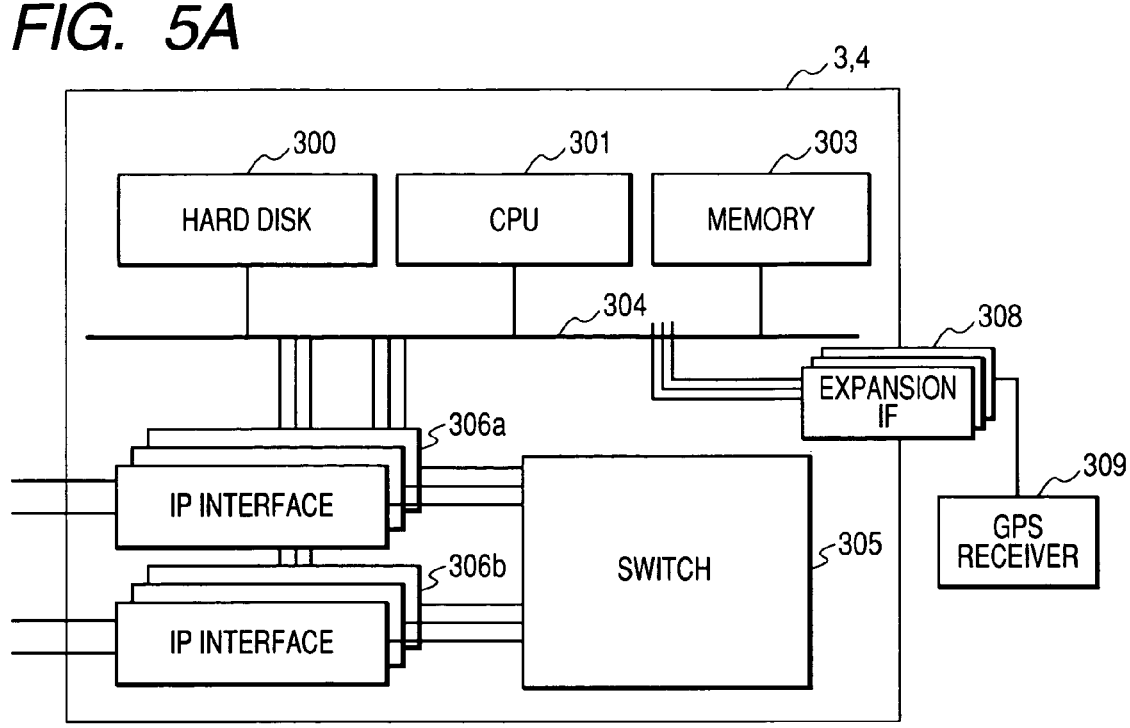
FIG. 5-A is a block diagram showing the structure of the hardware of the home agent and the correspondent terminal (other party terminal)
Figure 5B:
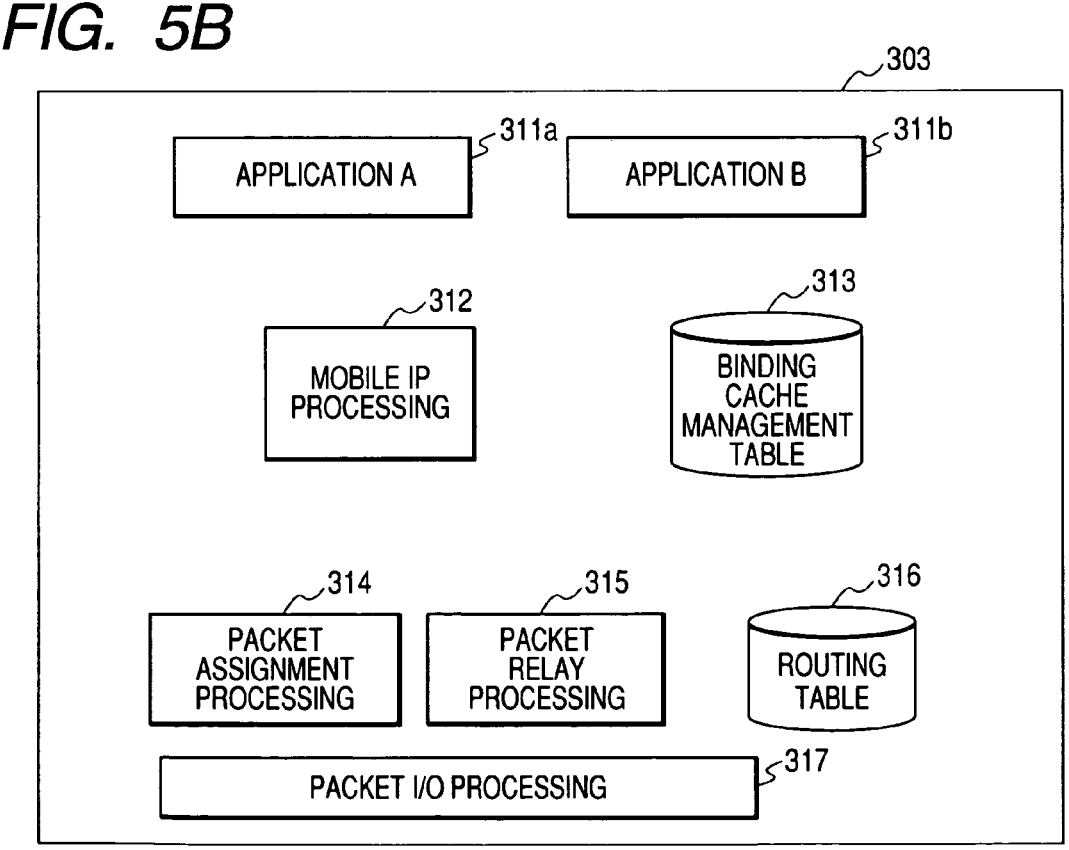

FIG. 5-A is a block diagram showing the hardware structure of the HA3 and the CN4 in the present invention.

The HA3 and the CN4 are comprised of at least six hardware blocks. Each of these hardware blocks is described next.

At least two or more IP interfaces (306a, 306b) for sending and receiving the IP packets.
A switch 305 for the IP interfaces
A hard disk 300 for storing information such as file settings that determine the operation of devices and software of the present invention
A memory 303 as a region temporarily utilized when executing the software of the present invention
A CPU 301 for managing the control of this device
An expansion interface 308 utilized when connecting the peripheral equipment to this device.

All the above hardware blocks are connected by the bus 304. A GPS receiver 309 is connected to the expansion interface 208 of the present invention for the purpose of collecting the physical position information of the HA3 and the CN4. This GPS receiver may be installed internally in the HA3 and the CN4. The physical position information may also be collected by a means other than a GPS receiver.

FIG. 5-B is a block diagram showing the structure of the software of the HA3 and the CN4 of the present invention. When an IP packet arrives at the HA3 and the CN4, the packet I/O processing 317 extracts the received IP packet. The packet I/O processing 317 verifies the destination address of the IP packet and if addressed to itself (HA3 or CN4), sorts the packet in the packet assignment processing 314. If not addressed to itself (HA3 or CN4), the packet is relayed by the packet relay processing 315. The packet assignment processing 314 verifies the data section of the IP packet, selects the next processing, and performs the appropriate processing. The packet relay processing 315 searches the routing table 316, determines the next destination to relay the IP packet to, and relays the IP packet via the packet I/O processing 317. The Mobile IP processing 312 controls the relay of the IP encapsulated packet and the receive processing for position registration (binding update) using the binding update (request) message shown in the example in FIG. 9. The Mobile IP processing 312 also manages the information such as the CoA and HoA relating to the Mobile IP, in the binding cache management table in the example shown in FIG. 11-B.

Figure 6:
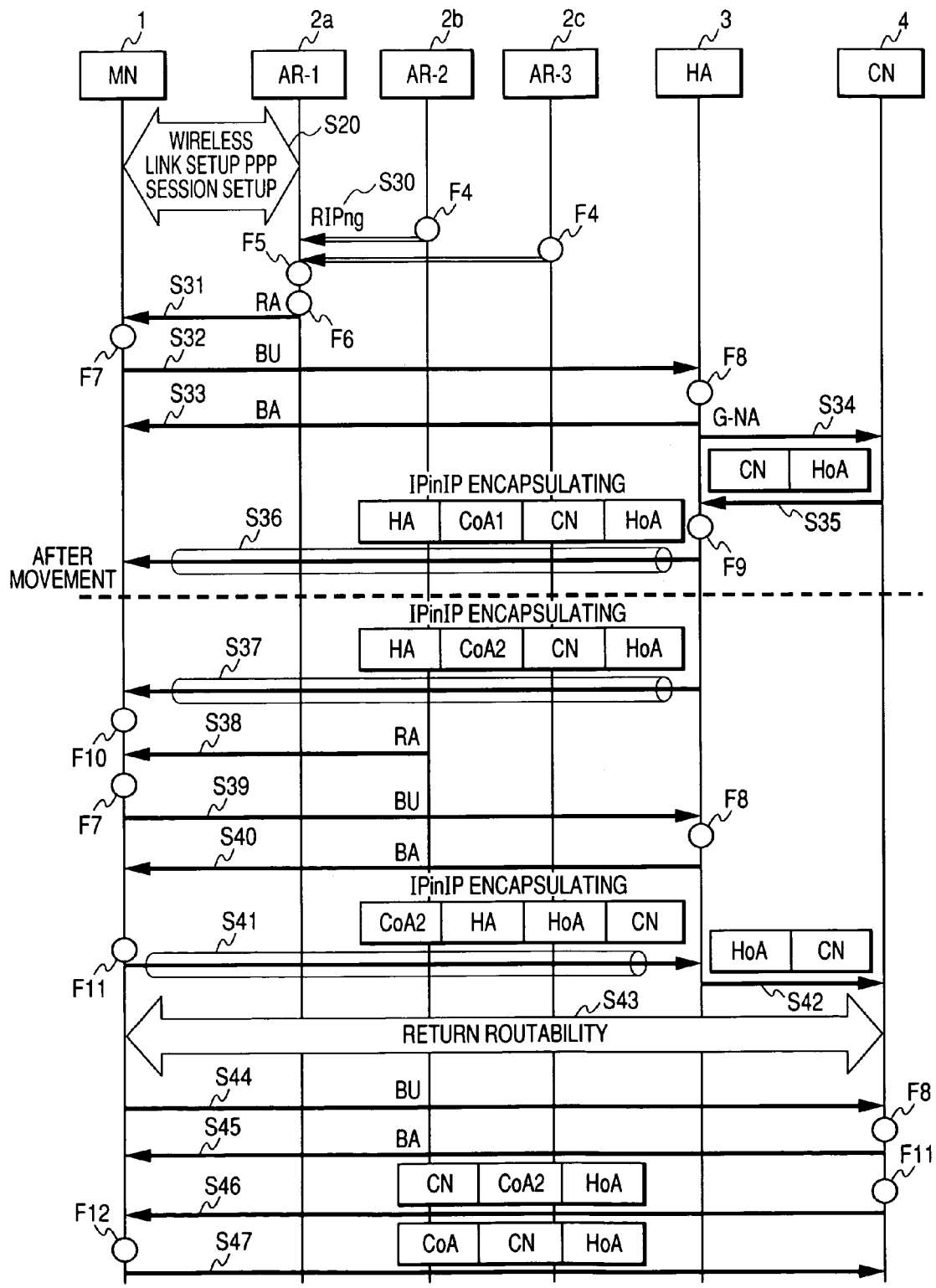
FIG. 6 is a diagram showing the sequence in the handover method of the present invention.

The operation sequence for mobile communication in the present invention is described next. In a typical example, FIG. 6 shows the operating sequence for the MN1 to communicate with the CN4 installed in the home network 5a, while the MN1 is moving from the host network 5d administered by AR2 (2b), to the host network 5e administered by AR-3 (2c) as shown in FIG. 2-A.

The MN1 and the AR (2a, 2b, 2c) in the figure include a means to hold physical position information and their own route information.

The router information management table (116, 215) for storing route information as shown in the example in FIG. 10-A is described next. The router information management table (116, 215) stores the network prefix 80, the prefix length 802, and the gateway address 803. When sending or relaying IP packets, this information is utilized to determine to what gateway to send the IP packet containing the destination address. The proximity flag 804 is a flag for deciding whether the network prefix 801 is for a network the AR2 or the MN1 themselves belong to. A proximity flag showing "0" indicates network information the AR2 or the MN1 themselves belong to. A proximity flag showing "1" indicates network information obtained by manual settings or a routine protocol. The AR flag 805 is a flag for deciding whether the network for network prefix 801 can be reported as an AR to the MN1.

An AR flag showing "0" indicates that the network prefix 801 is network information belonging to the relay network 5b or the home network 5a. An AR flag showing "1" indicates network information belonging to an MN1 host network (5c, 5d, 5e). The longitude 806, latitude 807, and altitude 808 indicate physical position information on the AR2 associated with the network prefix 801. The hop count 809 is a numerical value showing via how many routers the network prefix 801 can arrive. The reference flag 810 is used to prevent redundant searches when determining the control operation while referring to the router information management table (116, 215). The information from 801 through 810 stored on a single record 800 and multiple records are stored on the router information management table.

The terminal information management table 115 for storing physical position information is described next utilizing the example in FIG. 10-B. The terminal information management table 115 stores: the home address 821 of MN1, the list of currently used CoA list 822, a network prefix 823 for the AR2 currently connected with the host network, and the longitude 824, latitude 825 and altitude 826 as current physical position information for the MN1, all in a single record 820. The CoA list 822 is made up of a CoA priority sequence in a list structure for use when sending the IP packet.

The description of the operating sequence for mobile communication now continues while referring back to FIG. 6. The MN1 in the figure, first of all connects to the AR-1 (2a). When connecting in the second embodiment, the MN1 makes the PPP session setup (S20) after the wireless link setup. In the case of the first embodiment, the MN1 makes a direct IP connection to the AR-1 (2a).

The AR (2a, 2b, 2c) exchanges route (or path) information held respectively in the AR2 using a routing protocol represented here by RIPng (S30). In the present invention, route information is sent (F4) in the RIPngmessage format shown in the example in FIG. 7. In the RIPng message format of FIG. 7, the AR location information 516 (physical position information area) for the AR2 is added within the route table entry 515 in the format specified for "RIPng for IPv6" in IETF RFC2080. This AR location information 516 contains a longitude 506, latitude 507, altitude 508, and an AR flag 510, and a hop count 511 for the AR2 associated with the IPv6 prefix 502.

Figure 7:
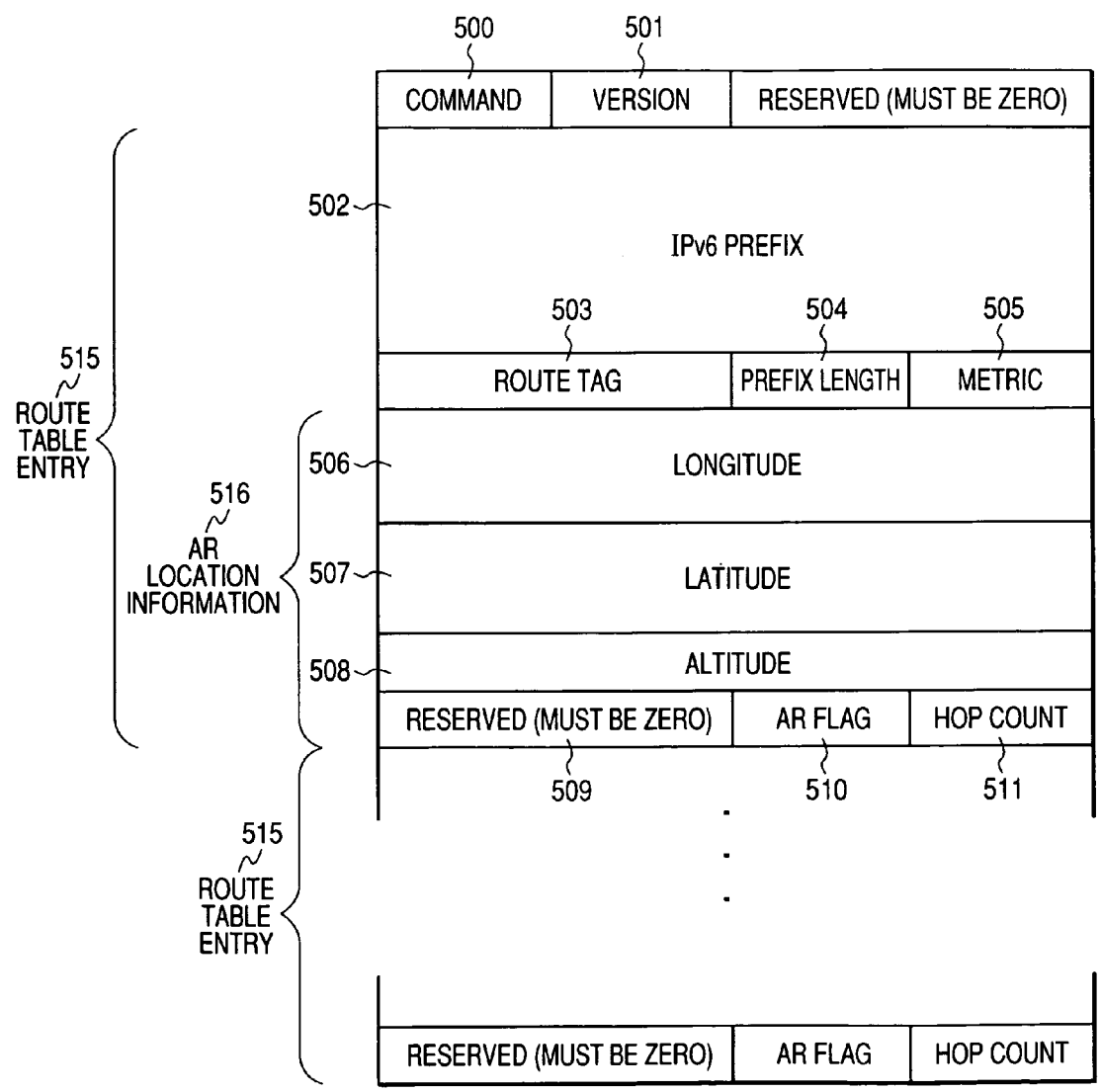
FIG. 7 is a diagram showing the RIPng message format.
Figure 12:
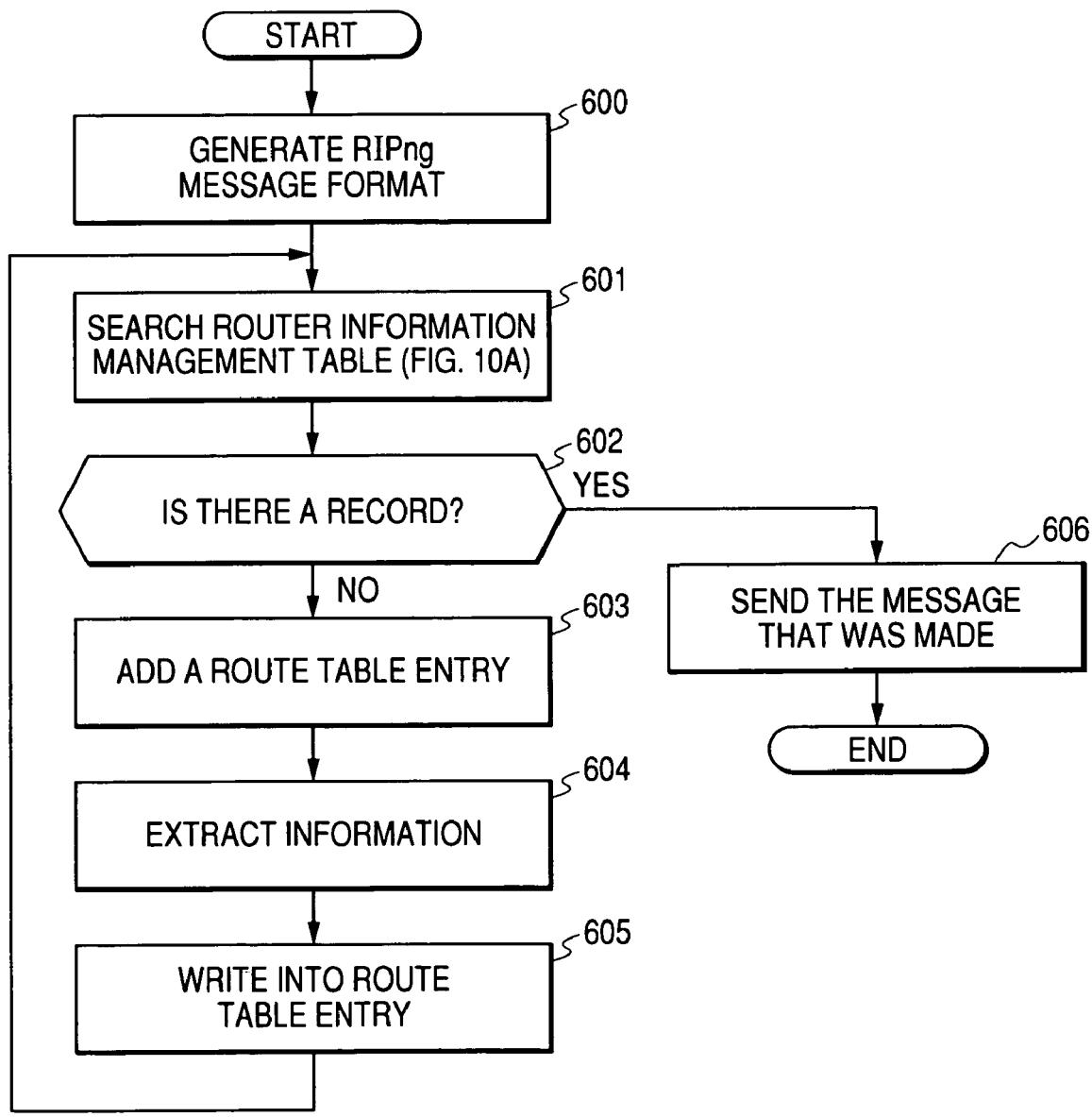
FIG. 12 is a flow chart showing the process flow during sending of the RIPng message by the access router.

The RIPng message format transmit processing (F4) executed by the AR2 (2b, 2c) is described next utilizing the examples in FIG. 7 and FIG. 12. The AR2 first of all generates (600) an RIPng message format as shown in FIG. 7. The AR2 next searches the router information management table 215 and extracts one record at a time (601). After extracting the record (602), and adding it to the route table entry 515 (603), the AR2 extracts information such as the network prefix 801, the longitude 806, latitude 807, and the AR flag 805 from within the record (604). The AR2 next writes (605) on the applicable area within the route table entry 515. One record at a time is then repeatedly extracted from the router information management table 215 again so that the route information held in the AR2 (2b, 2c) is utilized in the RIPng message format. The RIPng message is completed at the point in time that none of the records extracted from the router information management table 215 still remain. The AR2 (2b, 2c) then sends (606) the generated RIPng message to the nearby AR2 (2a).

Figure 13:
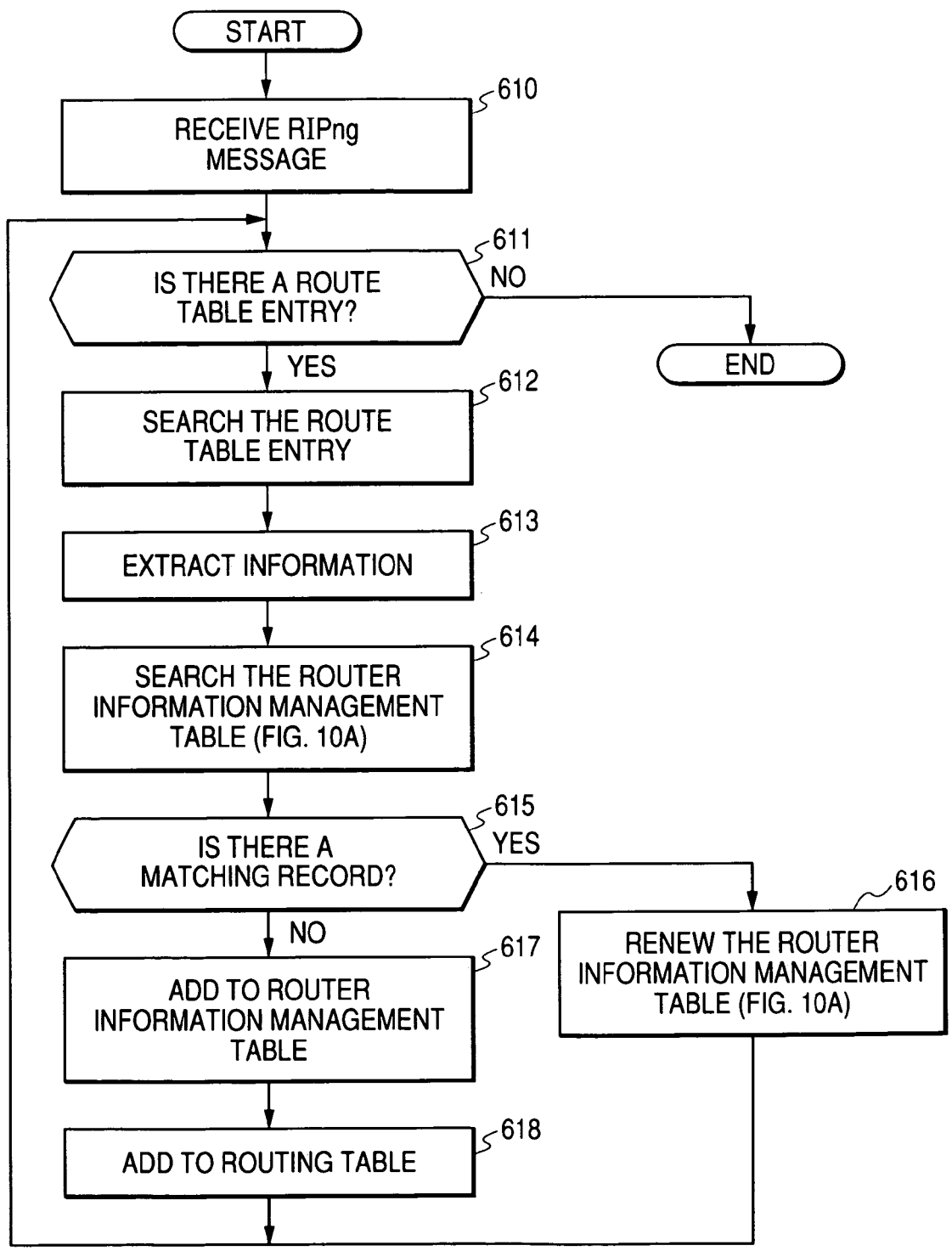
FIG. 13 is a flow chart showing the process flow during receiving of the RIPng message by the access router.

Returning now to FIG. 6, the process for receiving the RIPng message (S30) that the AR2 (2b, 2c) sent in the AR2 (2a) is described while referring to the examples in FIG. 7 and FIG. 13. First of all, in FIG. 7 after receiving the RIPng message (610), the AR2 confirms that there is an applicable route table entry 515 (611). When there is a route table entry 515, the AR2 extracts each items such as the IPv6 prefix 502 for the applicable entry (613). The AR2 next searches the router information management table 215 (614) and confirms whether there is a record matching the extracted items (615). If there is a matching record, then a check is made for the next route table entry 515, after rewriting the router information management table 215. If there is no matching record, new information is written onto the router information management table 215 (617), and information is simultaneously written (618) onto the routing table 218 in the packet relay processing 217 shown in FIG. 3-B as route information required during relay of the packet. The route information held by the nearby AR2 (2b, 2c) can from hereon be utilized in the AR2 (2a) router information management table 215, by extracting all of the route table entries 515 contained in the RIPng message.

The AR2 (2a, 2b, 2c) automatically collects physical position information and route information held in the respective routers using the routing protocol as described above.

Figure 8:
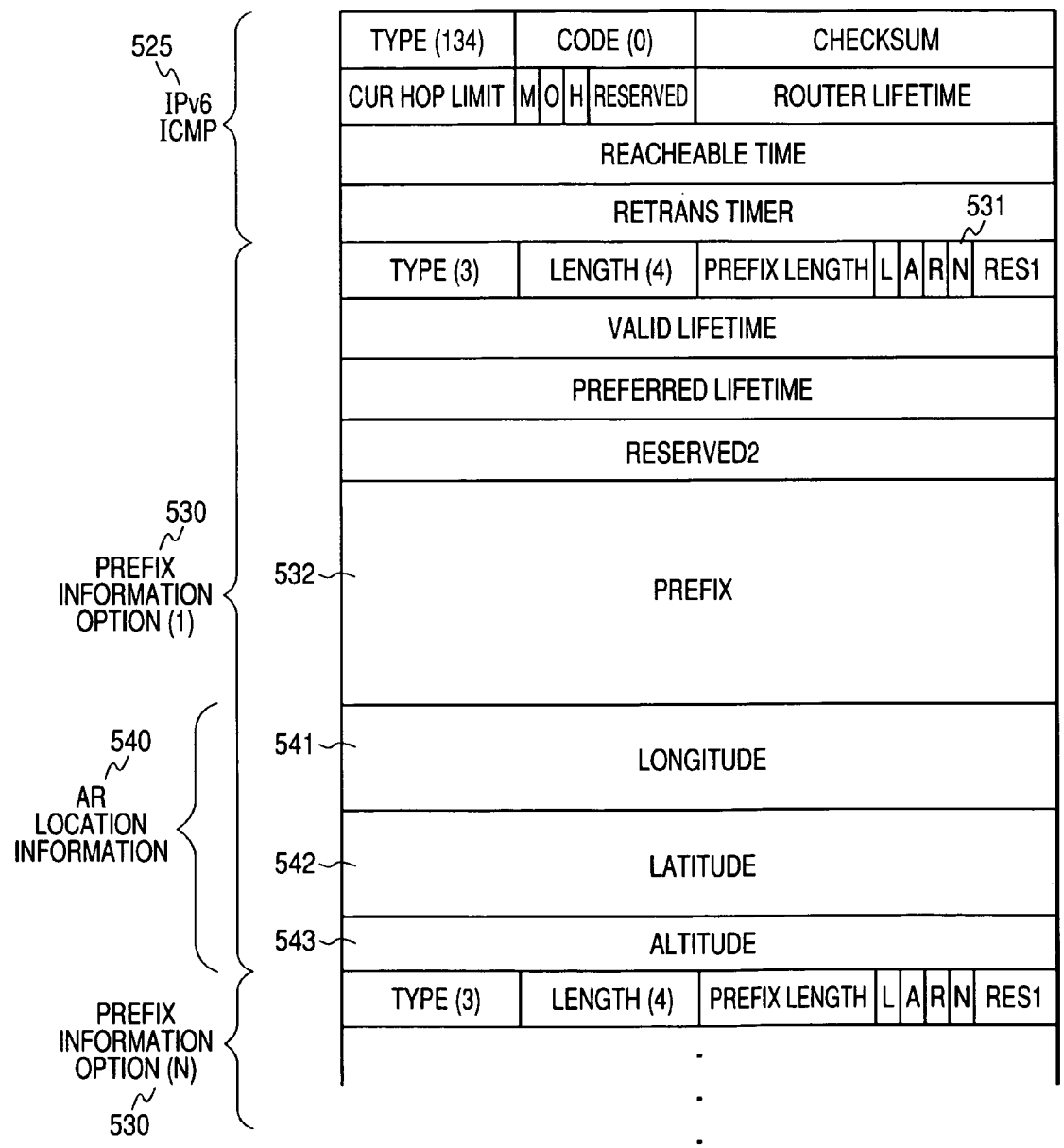
FIG. 8 is a diagram showing the message format of the IPv6 router advertisement.

The description of the operating sequence for mobile communication now continues while referring back to FIG. 6. Usually, the AR-1 (2a) sends a router advertisement (S31) from the network interface connected to the host networks (5c, 5d, 5e) to which the AR2 itself is connected, to the host networks (5c, 5d, 5e) to which the MN1 is connected. The MN1 that moved to the host networks (5c, 5d, 5e) can in this way be detected and a CoA valid in the host networks (5c, 5d, 5e) can be generated. The present invention is characterized in that the router AR2 (2a) sends a router advertisement as shown in FIG. 8. The router advertisement message shown in FIG. 8 is added to the AR physical position information 540 of AR2 in the prefix information option 530 area of the format specified in IETF "Mobility Support in IPv6".

An N bit 531 is added to the prefix 532 contained in the prefix information option 530 area to indicate network information associated with the AR2 itself, or nearby network information. The AR position information 540 contains information on longitude 541, latitude 542, and altitude 543 as physical position information on the AR2 connected to the prefix 532. Multiple prefix information option 530 areas can be stored within the router advertisement message. However, in the present invention there is a limit on the number of prefix information option 530 areas due to the need to store router advertisement messages within the maximum length range of the IP packet. Methods to set this limit include a method to keep adding areas as long as the maximum length of the IP packet is not reached, and a method to set limits on static settings made by the service personnel. In view of the need for efficiency during the MN1 handover, the AR2 (2a) preferably sends at least three items of network information on the nearest AR2 (2b, 2c) and the network to which the AR2 (2a) itself belongs.

Figure 14:
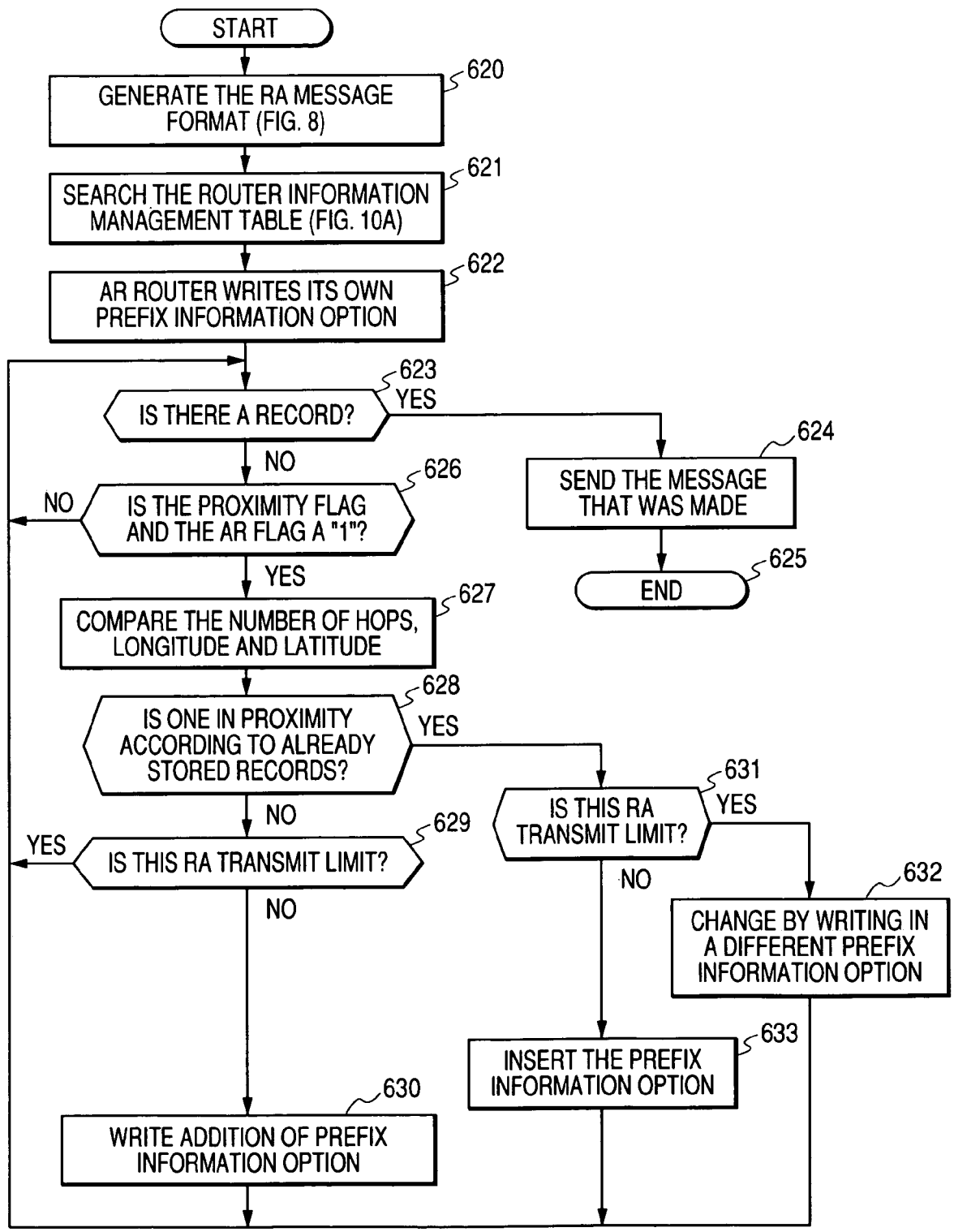
FIG. 14 is a flow chart showing the process flow during sending of the router advertisement by the access router.

The process (F6) for the AR-1 (2a) to send the router advertisement message is described next while referring to FIG. 14. The AR-1 first of all generates the router advertisement message format shown in FIG. 8 (620). Next, The AR-1 searches the router information management table 215 (621)

shown in FIG. 10-A, and after extracting a record with a proximity flag 804 of "0", utilizes each of the prefix information option 530 areas (622). The AR2 sets the N bit 531 to "0" to clearly show network information associated with the AR2 (2a) itself. Next, the AR-2 stores network information for the nearby AR2 (2b, 2c) in the router information management table 215, into the prefix information option 530 areas. This operation extracts one record at a time from the router information management table 215 up to the most recent record (623). When there is a (matching) record, the AR-2 checks that the proximity flag 804 is a "1" and also that the AR flag 805 is a "1" (626).

When there is no (matching) record matching this condition, then a decision is made that there is no valid network information on the MN1 and the process shifts to extracting the next record. If there is a record matching the condition, then the longitude 806, latitude 807, altitude 808, are extracted from the record in the router information management table 215 and are compared with the longitude 541, latitude 542, altitude 543 already stored in the prefix information option 530 (627). If farther away than any of the prefix information option 530 information, then the prefix information option 530 storage limit is checked (629) and if over the storage limit then the process shifts to extracting the next record. If the information can be stored then a new prefix information option 530 is written. However if determined to be nearer than the already stored position information (628), then the prefix information option 530 storage limit is checked (631). If the information can be stored then a new prefix information option 530 is written (633). If at the limit, then a substitution is made with the farthest record and it is written (632). The AR2 (2a) can therefore send an optimal router advertisement message by repeating the above process. After checking all the router information management table 215 records, the AR then sends the router advertisement message that was created (624)

As a result of the above process, the AR2 can select from within its own router advertisement, network information on the host network where the nearest AR is connected, and send it to the MN1.

Figure 15:
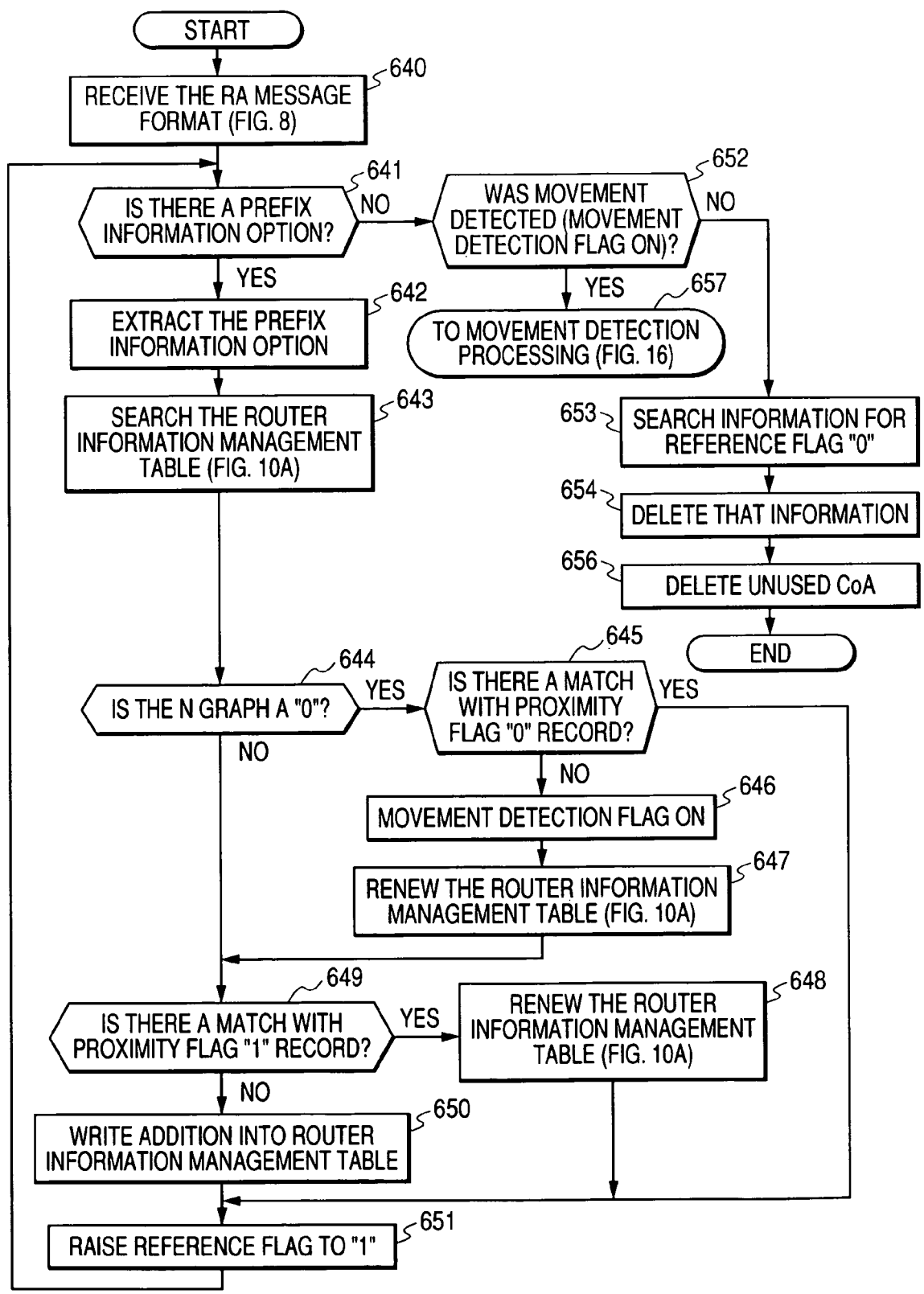
FIG. 15 is a flow chart showing the process flow during receiving of the router advertisement by the mobile terminal.
Figure 16:
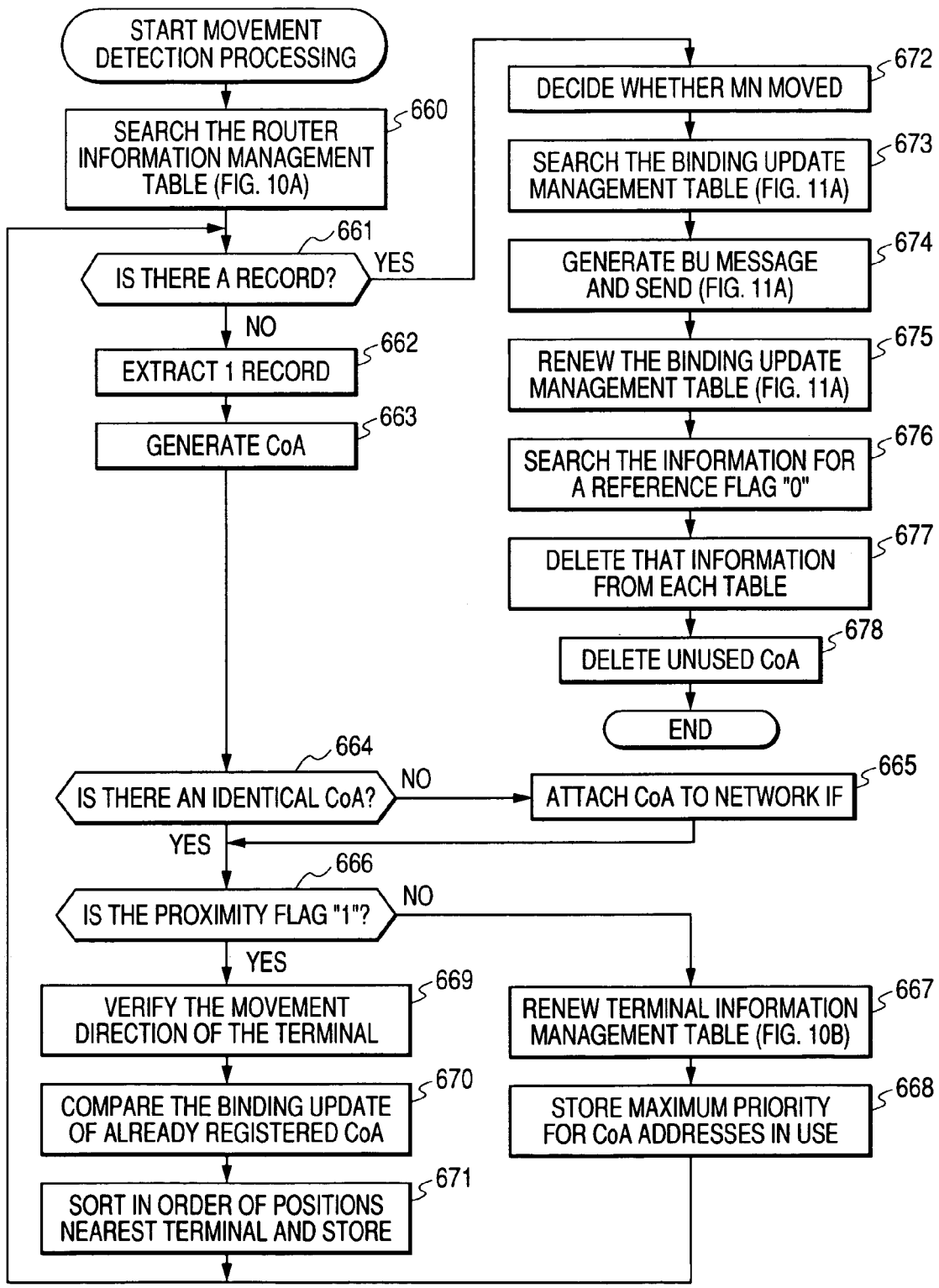
FIG. 16 is a flow chart showing the process flow for movement detection after receiving of the router advertisement by the mobile terminal.

Returning now to FIG. 6, the process for receiving (F7) the router advertisement message (S31) that the AR2 (2a) sent to the MN1 is described while referring to the examples in FIG. 15 and FIG. 16. The MN1 first of all receives (640) the router advertisement shown in FIG. 8. The MN1 next checks whether there is a prefix information option 530 within the received router advertisement message (641). If present, then the information contained within the prefix information option 530 is extracted (642). A search is next made of the router information management table 116 and a comparison made with the extracted information (643). A decision is made whether the N bit 531 within the prefix information option 530 is a "0" (644). If the N bit 531 is a "1" at this time then the network information stored in that prefix information option 530 can be identified as information on the host network 5d to where the MN1 has currently moved. If the N bit 531 is a "0" then a search is made for a record where the proximity flag 804 "0" within the router information management table 116. Next a decision is made whether the prefix length 802 and the network prefix 801 of the applicable record, match the prefix length and network prefix 532 extracted from within the prefix information option 530 (645).

If these (record info and option 530 info) are a match, then there is no change from the router advertisement that was received the previous time and so the AR determines that the MN1 has not moved. Then a "1" is stored in the reference flag 810 for a record in the router information management table 116 (651) to record that the table was searched, and the prefix option 530 then extracted. If the network information does not match, then the MN1 is identified as having moved to a host network different from the previous time. Therefore, after storing the detected movement in the flag (646), the "0" recorded in the proximity flag 804 is changed to a "1" (647).

Next, a decision is made whether the prefix length in records where the proximity flag 804 router information management table 116 is a "1" is a match with (the prefix length of) the network prefix 532 extracted from within the prefix information option 530 (649). If there is a matching record then the proximity flag 804 for that applicable record is changed to a "0" (648). When there is no matching record, a new entry is made to the router information management table 116 (650). A "1" is then recorded in the reference flag 810 (651) that records an addition or changing of the proximity flag 804 to "0", to show that it was referred to. The prefix information option 530 is then extracted.

However, when decided whether or not the N bit 531 in the prefix information option 530 is a "0" (644), when the N bit 531 is "1", the network information stored within the applicable prefix information option 530 area allows specifying network information for the host network 5c or the host network 5e which are the next movement destination candidates. In this case, a decision is made whether or not the prefix length in records where the proximity flag 804 within the router information management table 116 is "1", matches the prefix length of the network prefix 532 extracted from within the prefix information option 530 (649). When there is a matching record, the applicable record is updated to the most recent information (648). When there is no matching record, a new addition is made to the router information management table 116 (650). A "1" is later stored in the reference flag 810 (for additions or updated records) to record the fact that a search was made. The prefix information option 530 is then extracted.

When decided that there is no prefix information option 530 area that can be extracted (641), a check is made of whether the movement detection flag is standing (652). When no movement was detected, a search is made of records for reference flag 810 that is "0" within the router information management table 116 (653). The applicable record that was not information within the router advertisement and so is deleted from the router information management table 116 (654). Also there is no longer any need to use a CoA matching the network prefix 801 whose record was deleted, so the CoA is deleted from the network prefixes (106, 107). The CoA is at the same time also deleted from the CoA list used within the terminal information management table 115 shown in FIG. 10B (656).

The movement detection processing for MN1 shown in FIG. 16 is implemented (657) when decided that movement was detected while checking if the movement detection flag is standing (652). This process for detecting MN1 movement is processing for generating a CoA and making a binding update (position registration) onto the HA3 installed in the host network 5, and onto the CN4 during route optimizing. The processing is next described in more specific detail. A search is first of all made once again of the record within the router information management table 116 (660). One record at a time is extracted (662), and a CoA is generated (663) based on the prefix length 802 and the network prefix of the applicable record. A check is next made (664) on whether the generated CoA is already set within the MN1 network interface (106, 107). If not yet set, then the generated CoA is set into the network interfaces (106, 107) (665).

A check is next made within the extracted record for a proximity flag 804 of "1". When the proximity flag 804 is "0", then the applicable record can be identified as information on the host network 5*d* where the current MN1 has moved. The CoA that was generated from the applicable record information is used at highest priority. Therefore, the information generated or extracted from the applicable record, is utilized in the network prefix 823 of the connected AR and the priority 1 (827*a*) of the CoA list 822 used in the terminal information management table 115 shown in FIG. 10-B (667, 668). On the other hand, when the proximity flag 804 in the extracted record is a "1", the CoA generated from the applicable record is a valid IP address in the host network 5*c* or the host network 5*e* that are the next movement destination candidates, and its level of priority is determined and stored in the CoA list 822 used in the terminal information management table 115. In this processing, the MN1 physical position information is extracted from the longitude 824, latitude 825, and altitude 826 of the terminal information management table 115 (669).

The physical position information of an AR2 capable of using an already registered CoA is next compared with the extracted physical position information (670). The information is sorted in order of proximity to the MN1 physical position information and stored in the generated CoA (671).

After all records are extracted from within the router information management table 116, the CoA generated and the information stored, the MN1 sends a binding update message (position registration request message) to the HA3 and the CN4 within the optimized route (673). This processing is performed by sending a packet attached with a Mobile IPv6 Binding Update message shown in the example in FIG. 9 immediately after the IPv6 packet format of the IPv6 header. This patent is characterized in that an area is newly added area for storing information relating to the next period CoA, in the mobility options 560, in the Mobile IPv6 binding message update format as specified in IETF "Mobility Support in IPv6". During generation of the binding message, the CoA (827*a*) with the highest priority level is stored as the currently used CoA in the transmit source address of the IPv6 header. The IP address of the HA3 or the CN4 is the destination address.

Figure 9:
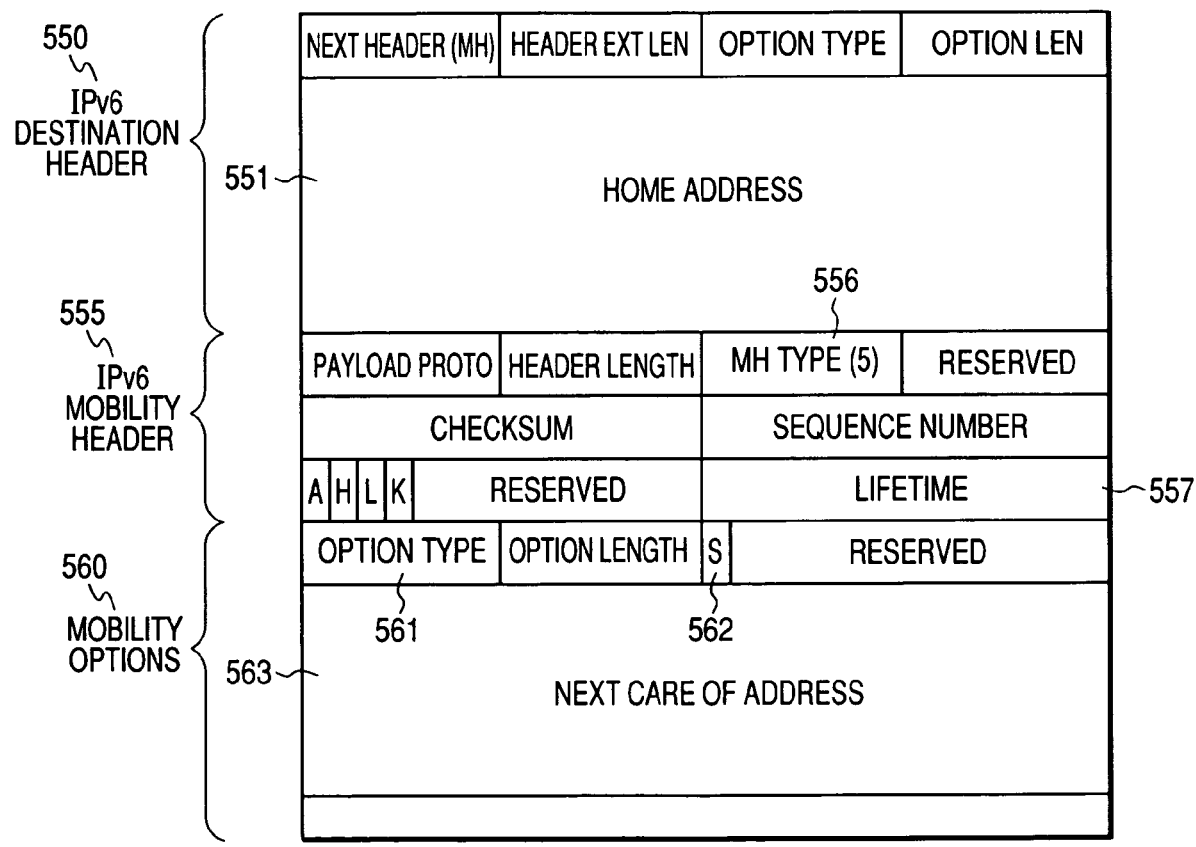
FIG. 9 is a diagram showing the message format requesting MobileIPv6 position registration (binding update)

The IPv6 destination header 550 of FIG. 9 is stored in the expansion header area of the IPv6 packet format. The home address 821 of the MN1 shown in FIG. 10B is stored in the home address option area within this header. An MH type 556 showing the binding update message request and a Lifetime 557 as the effective period for the reported CoA are stored in the IPv6 Mobility header area 555. The CoA (827*b*) at the second priority level from the CoA list in the terminal information management table 115 is stored as the next period CoA in the Mobility Options 560 area. The S bit 562 within the Mobility Options 560 area is used for requesting relay of the IP capsule for both the current CoA and the next period CoA, when the HA3 or the CN4 are sending an IP packet addressed to the MN1. The MN1 decides if itself is moving or not (672), when decided to be moving, the MN1 sets the S bit 562 to "1". When communicating while stopped in a host network the MN1 sets the S bit 562 to "0" to prevent IP packet copies from being sent from the HA3 or the CN4.

The MN1 as described above, searches the binding update table 117 shown in the example in FIG. 11-A (673), and after generating the binding update request message and sending it to the HA3 of binding update destination which is the HA3 or the CN4 during optimizing of the route (674), store the state of the binding update (position registration) in the binding update table 117 (675). The IP address 831 as the transmit destination for the binding update and the home address 832 of the MN1 stored in the binding update (request) message, the current CoA833, the next period CoA835 and effective period 835 of the CoA and the control flag 836 containing the S-bit are stored in the binding update table 117.

After rewriting the binding update table 117, the MN1 searches for a record with a reference flag 810 of "0" within the router information management table 116 (676). That applicable record is deleted from the router information management table 116 (677) because the applicable record is information that is not present within router advertisement message. There is also no need to use the CoA matching the network prefix 801 of the deleted record so it is deleted from the network interface (106, 107), and is also deleted at the same time from the CoA (CoA in use) list within the terminal information management table 115 shown in FIG. 10-B (678).

As a result of the above processing, the MN1 detects movement by receiving the router advertisement (S31) sent from the AR2, generates a CoA for use in the host network the MN1 moves to in the next period, and can send a binding update (position registration request) message containing CoA for both the HA3 and the CN4 (S32). The MN1 can in this way continue to communicate without packet loss even during repeated movement.

Figure 17:
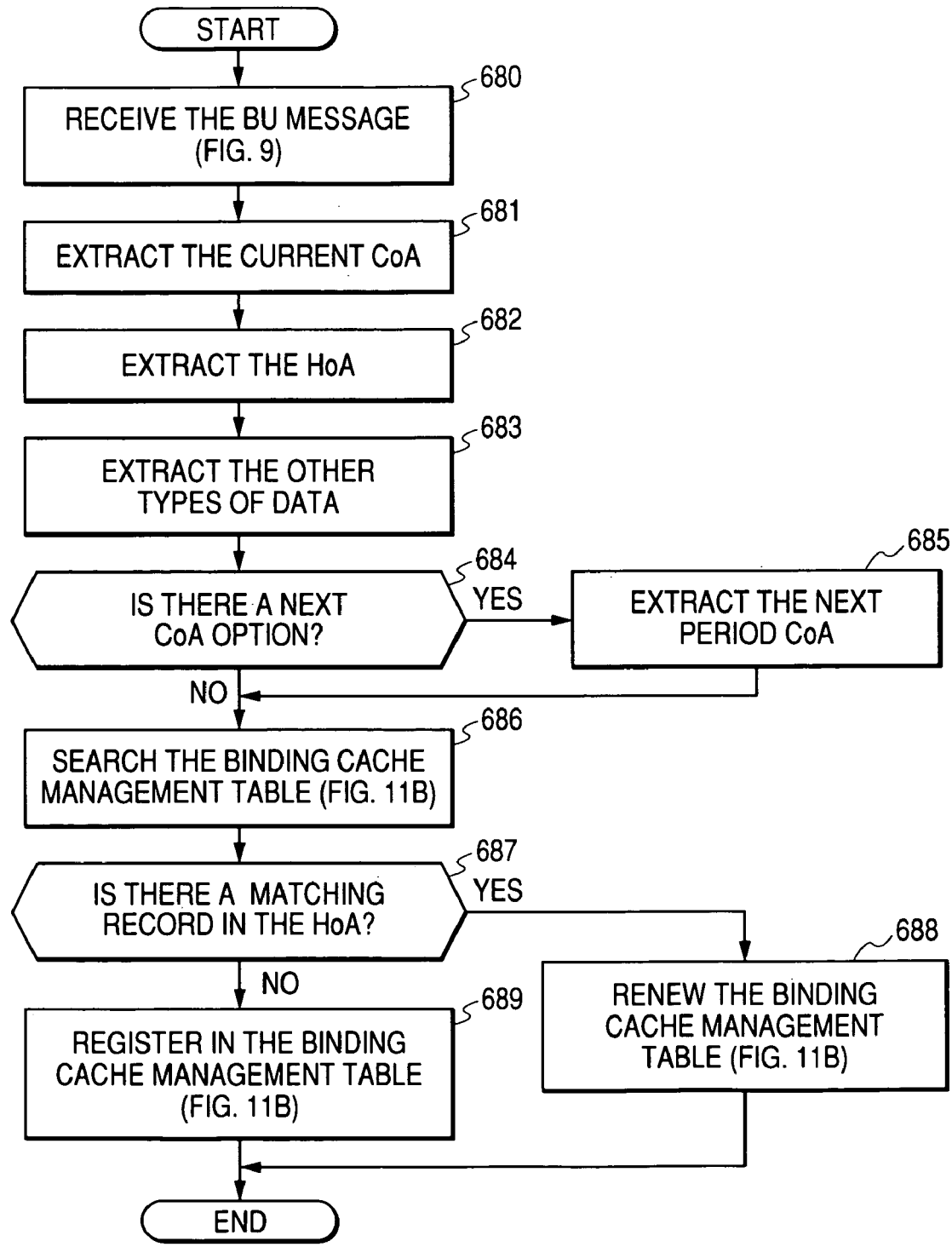
FIG. 17 is a flow chart showing the process flow during receiving of the binding update message by the home agent and the correspondent terminal (other party terminal)

Returning now to FIG. 6, the process for receiving (F8) the binding update message (S31) that the MN1 sent to the HA3 and the CN4 carrying out route optimization is described while referring to the example in FIG. 17. The HA3 or the CN4 receive the binding update message shown in FIG. 9 (680). After receiving the message, the HA3 or the CN4 extract the CoA currently used by the MN1, from the transmit source address of the IPv6 header area (681). The HoA of the MN1 is next extracted from the IPv6 destination header 550 area shown in FIG. 9 (682). After extracting other information such as the lifetime 557 (683), a check is made on whether there is a next period CoA option in the Mobility Option 560 (684). If there is a next period CoA option, then the next period CoA 563 and the S bit 562 comprising the control flag are extracted (685). The next extracted information is stored in the binding cache table 313 shown in FIG. 11-B (686). The present invention is characterized in that the next period CoA of the MN1 can be registered (binding entry) in the binding cache table 313. During storage, a check is first of all made of the binding cache table 313 for a record matching the extracted HoA (687). If there is a matching record, then the current CoA842 and next period CoA843 and lifetime 844 of the applicable record are rewritten (688). If there is no matching record, then a new entry is made in the binding cache management table 313 (689) and a binding update (ACK) reply message is sent to the MN1 (S33).

Figure 18:
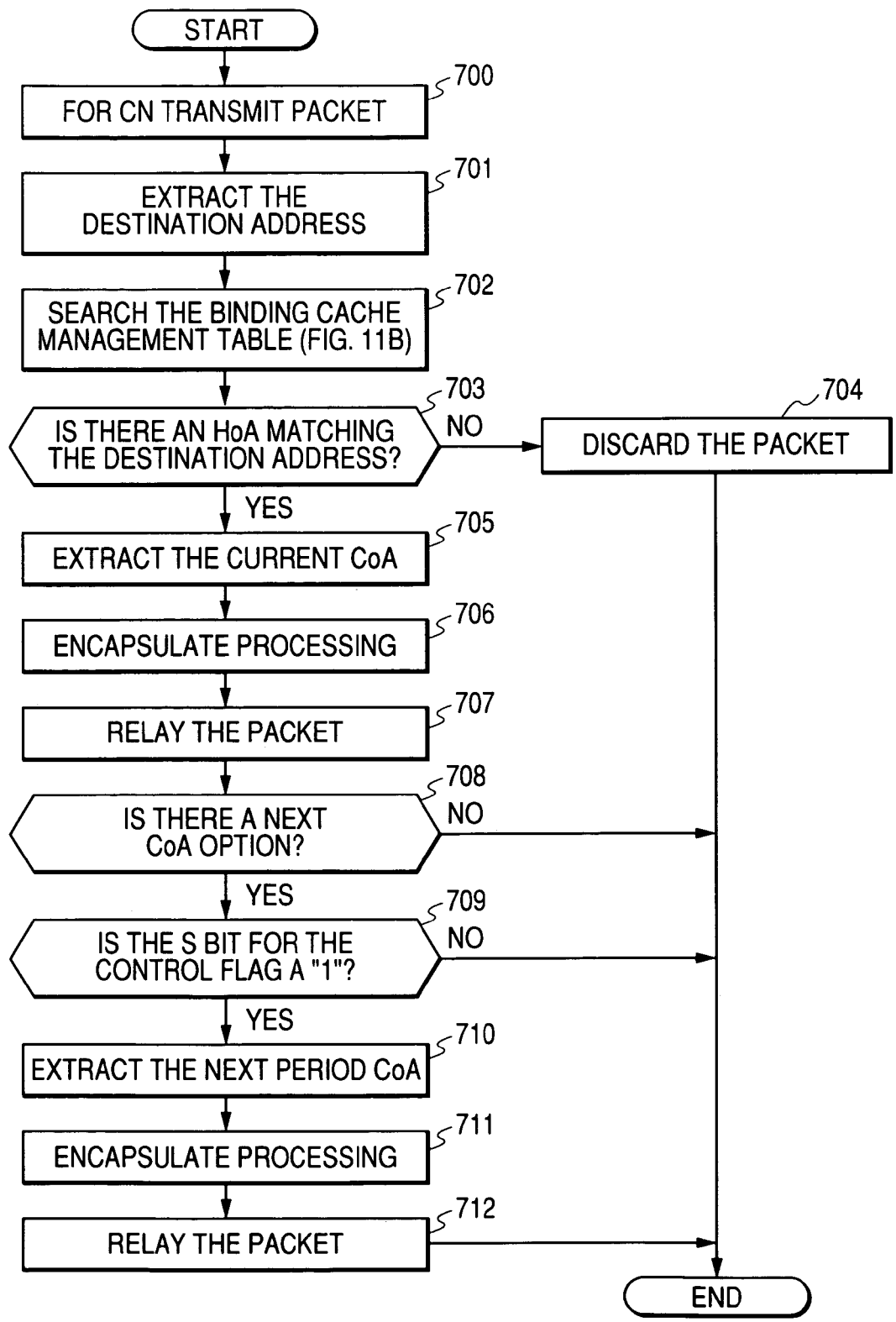
FIG. 18 is a flow chart showing the process flow during relaying of the packet by the home agent.

The HA3 that accepted the binding update (request) receives as a proxy, the packet addressed to the MN1. In order to relay this packet to the MN1, the HA3 sends a false NA message to the home network 5*a* to change the HoA address for the MAC address of the MN1, to the MAC address of the HA3 (S34). The HA3 can from hereon receive as a proxy, IP packets addressed to the MN1 (S35). The process for the HA3 to relay the IP packet to the MN1 is described next while referring to the example in FIG. 18 (F9) The HA3 receives as a proxy, those IP packets sent from the CN4 and addressed to the HoA of the MN1 (700). The HoA which is the transmit destination address of the received IP packet is extracted (701), the binding cache management table 313 shown in FIG. 11-B is searched (702) and a check is made for HoA matching that HoA (for MN1) (703). If there is no matching HoA, then the received IP packet is discarded and the process terminated (704). If there is a matching HoA, then the HA3 relays an encapsulated IP packet to the MN1.

In this processing, the current CoA 842 of the MN1 is extracted from the binding cache management table 313 (705). To encapsulate and relay the IP packet, the HA3 newly stores its own IP address in the transmit source address of the IP header area, stores the extracted current CoA of the MN1 in the destination address 402, and generate an IP header. Attaching the received IP packet to the IP header that was generated completes the encapsulated packet (706). The generated encapsulated packet is relayed to the MN1 (707). Next, the HA3 checks the binding cache table 313 to find whether or not a next period CoA843 for MN1 has been entered (binding entry) (708). If not registered, then the process for relaying the packet to the MN1 terminates. When a next period CoA843 has been registered, then the HA3 checks whether the S bit within the control flag 845 is set to "1" (709). An S bit that is set to "1" specifies that the MN1 is also requesting encapsulating and relay of the next period CoA843, so the next period CoA required for encapsulating and relay is extracted (710). An IP header is newly generated the same as in the previously described encapsulating process, and an encapsulated packet attached with the IP packet is generated (711). The next period CoA843 that was extracted is stored in the destination address 402 area within the newly generated IP header. Finally, then encapsulated packet that was generated is relayed to the MN1 (712) and the process terminates.

Therefore, when the HA3 receives a packet addressed to the MN1, the HA3 encapsulates and sends the packet to the current CoA and next period CoA registered (binding entry) by the MN1 (S36, S37). The MN1 can in this way receive an IP packet immediately after moving to the host network Se which is its movement destination.

Figure 19:
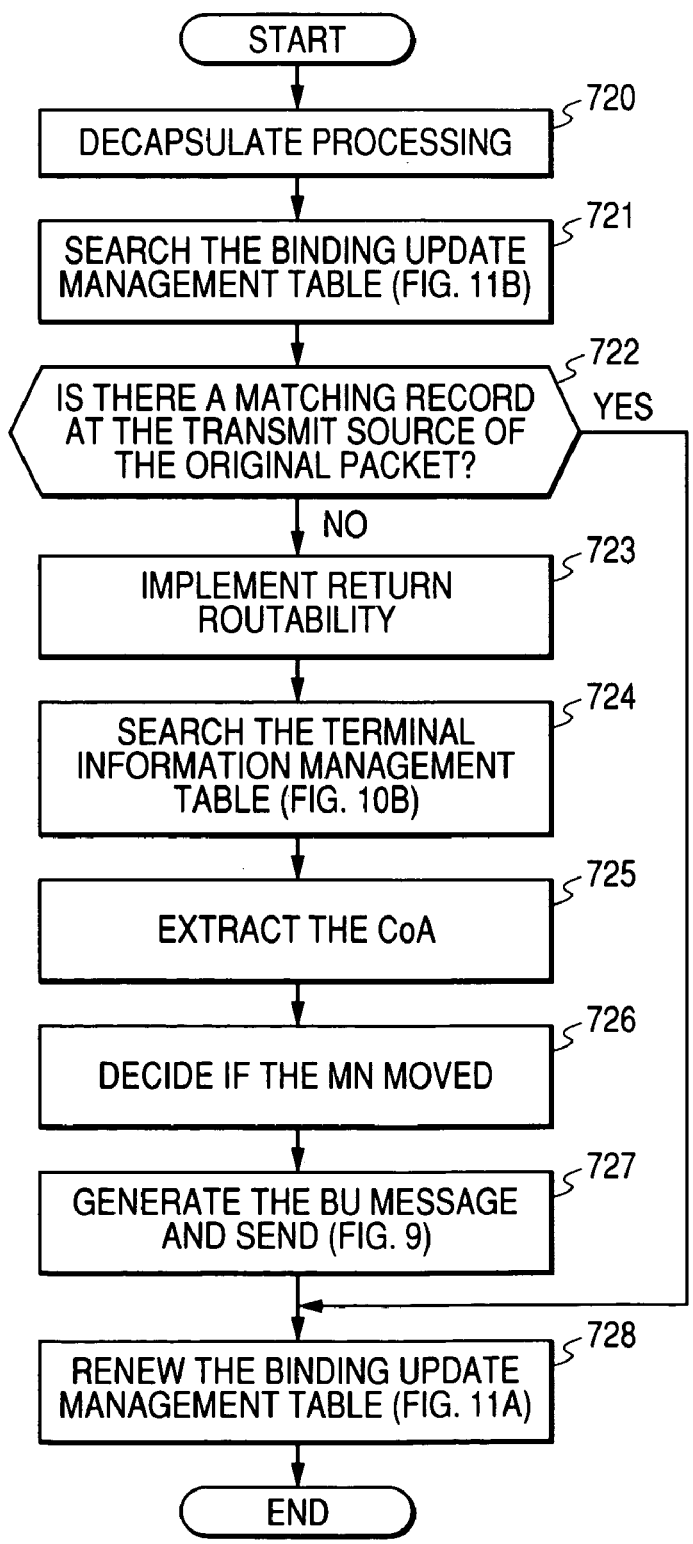
FIG. 19 is a flow chart showing the process flow during receiving of the encapsulated packet by the mobile terminal.

Next, when the MN1 has received the encapsulated packet (S36, S37) from the HA3, the MN1 usually notifies the CN4 of the CoA currently in use and from hereon communications between the MN1 and the CN4 are performed by route optimization that allows direct communication rather than communicating via the HA3. This patent is characterized in that the MN1 includes the next period CoA in the binding update (position registration) message sent to the CN4, the same as with the binding update message sent to the HA3. This optimization route processing is described while referring to FIG. 19. The MN1 decapsulates the encapsulated packet that was received (720).

Next, a search is made of the binding update table 117 (721) to find if there is a record matching the transmit source address of the original packet (722). If there is a matching record, then route optimization processing for the CN4 is determined to have already been performed and this processing terminates. When there is no matching record, the MN1 implements route optimizing to notify the CN4 of the CoA currently in use. First of all, Return Routability communication as specified in IETF "Mobility Support in IPv6" is implemented before sending the BU (binding update) message (723, S43). After completion of Return Routability, the MN1 searches the terminal information management table 115 (724), extracts the next period CoA and the current CoA (725), decides movement was performed (726), and extracts the information required to generate a BU (binding update) message, the same as performed when sending a BU message to the HA3. After generating the BU (binding update) message, the MN sends it to the CN4 (727, S44), and after rewriting the binding update table 117 (728), terminates the route optimizing.

Figure 20:
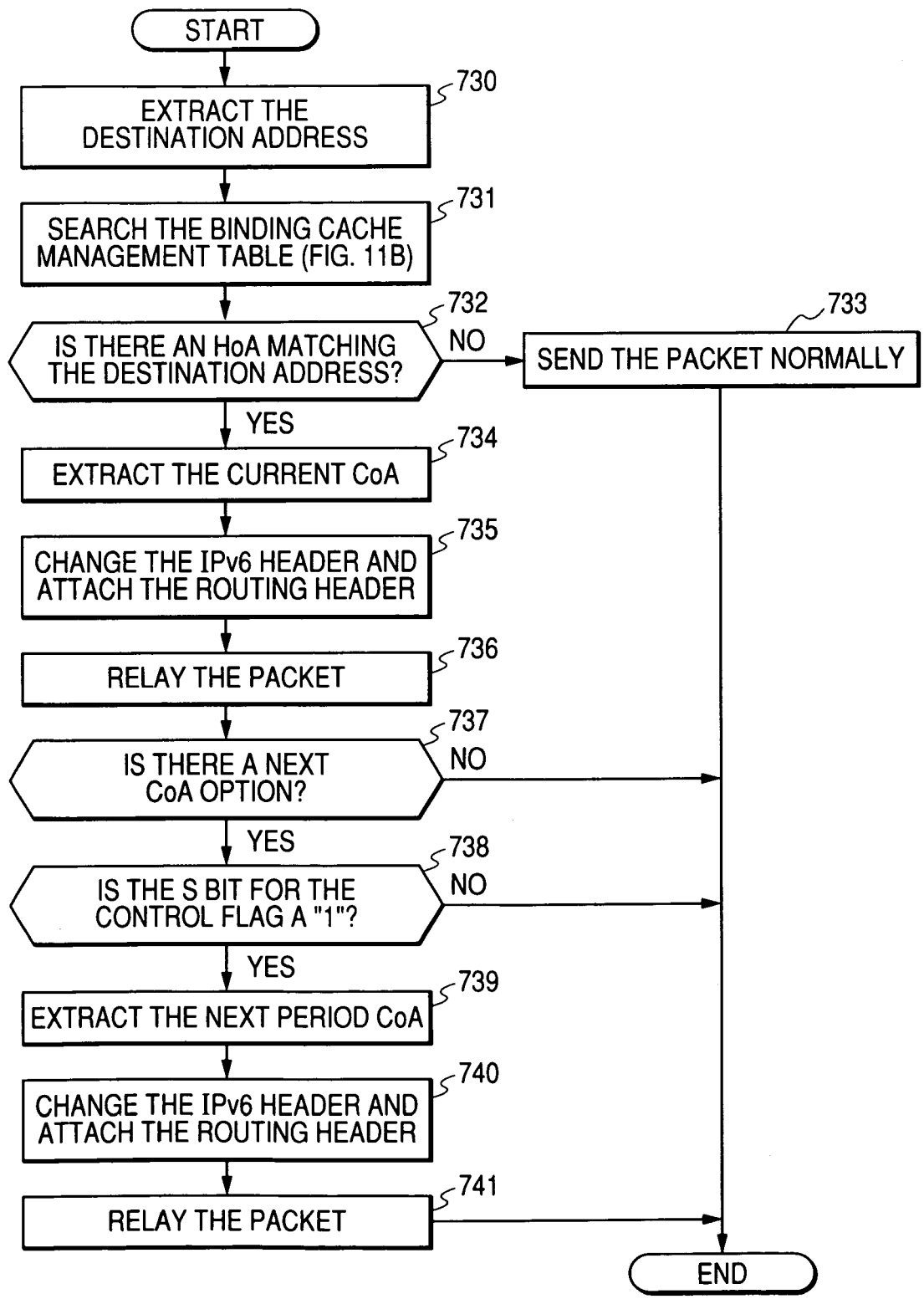
FIG. 20 is a flow chart showing the process flow for sending the packet after route optimization by the correspondent terminal (other party terminal)

The CN4 receives the binding update message from the MN1 the same the HA3 (F8). After the route optimizing, the CN4 sends packets directly to the current CoA and next period CoA of the MN1 when sending packets to the MN1 (S46). The processing (F11) by the CN4 for sending IP packets addressed to the MN1 is described next using the example in FIG. 20. The IP packet sent by the CN4 is first of all generated in the application 311 shown in FIG. 5B. The HoA of the MN1 is stored in the IP header transmit destination source address of the original packet generated in the application 111, and the IP address of CN4 is stored in the transmit source address. This packet is sent to the Mobile IP processing 312 and IP packet conversion is performed. The Mobile IP processing 312 extracts the destination address of the IP packet that was sent (730).

Next, the CN4 searches the binding cache management table 313 shown in FIG. 11-B (731) and checks whether or not there is a matching HoA for the MN1 in the destination address (732). If there is no matching HoA, then the transmit IP packet is sent unchanged. This packet is then relayed to the MN1 via the HA (733). If there is a matching HoA, then route optimizing is determined to have been implemented between the MN1 and CN4, and the current CoA842 of the MN1 is extracted from the binding cache management table 313 (734). The current CoA that was extracted is rewritten into the transmit destination address (=HoA) stored in the IP header. The HoA which is the source for the transmit destination address is stored in the route control expansion header (735). The CN4 in this way, converts its own IP packet for transmit, generates a new transmit IP packet, and transmits it to the MN1 (736).

Next, the CN4 checks whether or not the next period CoA843 of MN1 is registered (entered) in the binding cache management table 313 (737). If not registered, then the process for relaying the packet terminates. If the next period CoA843 has been registered, then a check is further made of whether the S bit within the control flag 845 is set to a "1" (738). If the S bit is set to a "1", then this specifies that the MN1 is requesting the sending of an IP packet to the next period CoA, and the next period CoA843 required for the IP packet is then extracted (739). The IP packet conversion is performed the same as previously described (740). The CN4 relays the packet to the MN1 (741) and the processing terminates.

As a result of the above processing, the packet loss that accompanies MN1 movement can be reduced even communication where the route optimizing was performed between the MN1 and the CN4.

Next, returning to FIG. 6, when the MN1 has moved from AR-1 (2a) to the area administered by AR-2 (2b), the AR-2 (2b) receives the router advertisement that was sent (S38). The MN1 performs movement detection and makes a binding update (position registration) request (S39, F7). After also having performed the binding update (F8) processing, the HA3 prepares to relay the packet to MN1 (S40).

The processing (F12) when the MN1 sends an IP packet to the CN4 from the host network is described next while referring to the example in FIG. 21. The IP packet sent by the MN1 is first of all generated in the application 110 shown in FIG. 4-B. This packet is relayed to the Mobile IP processing 114 for IP encapsulation. The Mobile IP processing 114 inputs the original packet generated in the application 110 (750). The HoA of the MN1 is stored in the transmit source address of the IP header of the original packet, and the IP address of the CN4 is stored in the transmit destination address. The transmit destination address of the original packet is extracted next (751). A search is made of the binding update management table 117 (752) shown in FIG. 11-A to confirm whether or not there is a BU (binding update) transmit destination address 831 matching the extracted transmit destination address (753). If there is no matching transmit destination address, then a check is made whether or not there is a matching HoA832 in the transmit source address (754), if there is no matching HoA832, then the original packet is discarded (755) and the packet transmit process terminates. If there is a HoA832 matching the transmit source address, then transmission is determined to be via the HA4. When there is a BU transmit destination address 831 matching the transmit destination address, then route optimization with the CN4 is determined to have been implemented and the transmit flag to the CN4 is raised (756).

The MN1 extracts current CoA and the next period CoA834 (757). The MN1 then searches the list of CoA in use in the terminal information management table 124 shown in FIG. 10-B (758), and selects a high priority CoA (759). The MN1 next checks whether or not the transmit flag to the CN4 is raised (present) in order to perform conversion to the original packet (760). If the flag is not raised at this point then the transmit process is via the HA3 and therefore a new IP header is generated the same as described for the encapsulating process (761) and attached to the original IP packet to generate the encapsulated packet. The selected CoA is stored in the transmit source address of the newly generated IP header, and the IP address of the HA3 is stored in the destination address, and finally the generated encapsulated packet is sent (763). On the other hand, when the transmit flag to the CN4 is raised, then IP header conversion is performed and a destination address expansion header is attached for optimized route transmission to the CN4 (762). This processing rewrites the selected CoA into the transmit source address (=HoA) stored in the IP header, and stores the HoA which is the original transmit source address, into the destination address expansion header. The converted IP packet is sent directly to the CN4 (763) and the processing terminates.

As clearly shown in the above embodiments, because packets can be received immediately after the mobile terminal has moved, the present invention allows smooth real-time communication that is otherwise normally susceptible to effects of packet transfer delays and packet loss. Further, since the presence of access routers in proximity to the network connected to the mobile terminal can be confirmed the present invention can also be used in application where the mobile terminal user constantly selects movement destinations where communication is possible and schedules mobile terminal movement. The present invention can also be used in applications for evaluating the structure of the mobile communications network since the provider of the mobile communication network can easily grasp the installation status of the access router.

What is claimed is:

1. A communication system including a plurality of packet routers and a
    server connected over a network to first and second terminals, wherein
    the server includes a memory for storing the match between the address in the home network and the address of the movement destination of the terminal managed by the server itself, and
    at least one packet router among the plurality of packet routers includes:
    a transmit section for sending to a first terminal, information on a network where at least one other router among the plurality of packet routers is connected, and information on the network where its own packet router is connected, and
    the first terminal includes a transmit section to send two care-of addresses generated respectively from information on a network connected to the first packet router and information on a network connected to another packet router, and
    the server or the second terminal that has received the two care-of addresses includes:
    a transmit section to send packets with duplicate contents to the two care-of addresses that have been received.

2. A communication system according to claim 1, wherein the network information sent to the first terminal by the first packet router is a router advertisement.

3. A communication system according to claim 1, wherein the first terminal is a mobile node for the Mobile IP, and the server is a home agent for the first terminal.

4. A communication system according to claim 1, wherein the first terminal includes:
    a transmit section to send to the server or to the second terminal, information on whether or not the first terminal is moving, and
    the server or to the second terminal that has received the information includes a transmit section to send packets with duplicate contents to the two care-of addresses when the terminal is in movement.

5. A server according to claim 4 wherein a terminal is a mobile node for the Mobile IP, and the server is the home agent for that terminal.

* * * * *